(12) United States Patent
Kim et al.

(10) Patent No.: US 11,381,557 B2
(45) Date of Patent: Jul. 5, 2022

(54) SECURE DATA TRANSMISSION USING A CONTROLLED NODE FLOW

(71) Applicant: PRIBIT Technology, Inc., Seoul (KR)

(72) Inventors: Young Rang Kim, Seoul (KR); Yeontaek Lim, Seoul (KR); Minjae Lee, Seoul (KR)

(73) Assignee: PRIBIT Technology, Inc., Seoul (KR)

( * ) Notice: Subject to any disclaimer, the term of this patent is extended or adjusted under 35 U.S.C. 154(b) by 303 days.

(21) Appl. No.: 16/580,974

(22) Filed: Sep. 24, 2019

(65) Prior Publication Data
US 2021/0092095 A1 Mar. 25, 2021

(51) Int. Cl.
| G06F 21/71 | (2013.01) |
| G06F 12/0868 | (2016.01) |
| H04L 9/40 | (2022.01) |
| G06F 13/38 | (2006.01) |

(52) U.S. Cl.
CPC ...... *H04L 63/0876* (2013.01); *H04L 63/0209* (2013.01); *H04L 63/101* (2013.01)

(58) Field of Classification Search
None
See application file for complete search history.

(56) References Cited

U.S. PATENT DOCUMENTS

| 7,606,902 | B2 | 10/2009 | Rao et al. |
| 7,978,714 | B2 | 7/2011 | Rao et al. |
| 8,019,868 | B2 | 9/2011 | Rao et al. |
| 8,291,119 | B2 | 10/2012 | Rao et al. |
| 8,363,650 | B2 | 1/2013 | Rao et al. |
| 8,843,998 | B2 | 9/2014 | Fu et al. |
| 8,892,778 | B2 | 11/2014 | Rao et al. |
| 8,897,299 | B2 | 11/2014 | Rao et al. |
| 9,088,564 | B1 | 7/2015 | Hobson et al. |
| 9,578,052 | B2 | 2/2017 | Cp et al. |
| 9,715,597 | B2 | 7/2017 | Smith et al. |

(Continued)

FOREIGN PATENT DOCUMENTS

| EP | 3254415 A1 | 12/2017 |
| JP | 2007243655 A | 9/2007 |

(Continued)

OTHER PUBLICATIONS

Classifying Internet One-way Traffic. Glatz. ACM. (Year: 2012).*

(Continued)

*Primary Examiner* — Venkat Perungavoor
(74) *Attorney, Agent, or Firm* — Whitmyer IP Group LLC

(57) ABSTRACT

The disclosed embodiments relate to securely transferring data between a source node and a destination node using an application whitelist. A control flow may be established between a source node and a perimeter gateway. the perimeter controller may receive a request to establish a node flow between an application executing on the source node and the destination node. the perimeter controller may determine whether the first application is included in an application whitelist that includes applications allowed to transfer data to nodes in a private network via a node flow. A node flow between the source node and destination node may be established upon determining that the first application is included in the application whitelist to facilitate secure data transfer between the source node and destination node.

29 Claims, 33 Drawing Sheets

(56) References Cited

U.S. PATENT DOCUMENTS

| | | | |
|---|---|---|---|
| 9,984,230 | B2 | 5/2018 | Pikhur et al. |
| 10,162,767 | B2 | 12/2018 | Spurlock et al. |
| 10,176,344 | B2 | 1/2019 | Smith et al. |
| 10,205,743 | B2 | 2/2019 | Cp et al. |
| 10,243,833 | B2 | 3/2019 | Tang et al. |
| 10,339,303 | B2 | 7/2019 | Mehta et al. |
| 10,484,334 | B1 | 11/2019 | Lee et al. |
| 10,659,434 | B1 | 5/2020 | Kim et al. |
| 10,659,462 | B1 | 5/2020 | Kim et al. |
| 10,785,111 | B2 | 9/2020 | Hill et al. |
| 2002/0163920 | A1 | 11/2002 | Walker et al. |
| 2006/0029062 | A1 | 2/2006 | Rao et al. |
| 2006/0029063 | A1 | 2/2006 | Rao et al. |
| 2006/0029064 | A1 | 2/2006 | Rao et al. |
| 2006/0037071 | A1 | 2/2006 | Rao et al. |
| 2010/0002693 | A1 | 1/2010 | Rao et al. |
| 2010/0024026 | A1 | 1/2010 | Ylonen et al. |
| 2013/0014206 | A1 | 1/2013 | Rao et al. |
| 2013/0128892 | A1 | 5/2013 | Rao et al. |
| 2013/0322255 | A1 | 12/2013 | Dillon |
| 2014/0101716 | A1 | 4/2014 | Touboul |
| 2014/0237137 | A1* | 8/2014 | Ervin ............... H04L 45/38 709/238 |
| 2014/0301397 | A1* | 10/2014 | Zhou ............... H04L 45/74 370/392 |
| 2015/0121449 | A1 | 4/2015 | Cp et al. |
| 2015/0341259 | A1* | 11/2015 | Li ............... H04L 45/50 370/392 |
| 2016/0092700 | A1 | 3/2016 | Smith et al. |
| 2016/0142293 | A1* | 5/2016 | Hu ............... H04L 45/745 370/392 |
| 2016/0180092 | A1 | 6/2016 | Aktas |
| 2016/0182550 | A1 | 6/2016 | Spurlock |
| 2016/0285735 | A1* | 9/2016 | Chen ............... H04L 45/02 |
| 2016/0359673 | A1 | 12/2016 | Gupta et al. |
| 2016/0360352 | A1* | 12/2016 | Khan ............... H04W 4/80 |
| 2016/0371484 | A1 | 12/2016 | Mehta et al. |
| 2016/0378685 | A1 | 12/2016 | Spurlock et al. |
| 2016/0378975 | A1 | 12/2016 | Pikhur et al. |
| 2016/0379003 | A1 | 12/2016 | Kapoor et al. |
| 2016/0381051 | A1 | 12/2016 | Edwards et al. |
| 2017/0063782 | A1 | 3/2017 | Jain et al. |
| 2017/0078184 | A1 | 3/2017 | Tang et al. |
| 2017/0118228 | A1 | 4/2017 | Cp et al. |
| 2017/0339631 | A1 | 11/2017 | Pugaczewski et al. |
| 2018/0018476 | A1 | 1/2018 | Smith et al. |
| 2019/0014152 | A1 | 1/2019 | Verma et al. |
| 2019/0109822 | A1 | 4/2019 | Clark et al. |
| 2019/0109848 | A1* | 4/2019 | Clark ............... H04L 63/1441 |
| 2019/0155752 | A1 | 5/2019 | Spurlock et al. |
| 2019/0173891 | A1 | 6/2019 | Cp et al. |
| 2019/0222559 | A1 | 7/2019 | Wang et al. |
| 2019/0238592 | A1 | 8/2019 | Qureshi et al. |
| 2019/0278908 | A1 | 9/2019 | Mehta et al. |
| 2020/0177550 | A1* | 6/2020 | Valluri ............... H04L 63/0209 |
| 2020/0213154 | A1* | 7/2020 | Han ............... H04L 12/4625 |
| 2020/0244625 | A1 | 7/2020 | Tummalapenta et al. |
| 2020/0287749 | A1* | 9/2020 | Glazemakers ............ H04L 63/10 |
| 2020/0389393 | A1* | 12/2020 | Bosch ............... H04L 61/1511 |
| 2021/0243163 | A1* | 8/2021 | Miriyala ............. H04L 41/0893 |
| 2021/0360083 | A1* | 11/2021 | Duggal ............... H04L 67/34 |

FOREIGN PATENT DOCUMENTS

| | | | |
|---|---|---|---|
| JP | 2009163546 | A | 7/2009 |
| JP | 2011015327 | A | 1/2011 |
| JP | 5239341 | B2 | 7/2013 |
| JP | 2017535843 | A | 11/2017 |
| JP | 2017537501 | A | 12/2017 |
| JP | 2018524843 | A | 8/2018 |
| JP | 2019079504 | A | 5/2019 |
| KR | 20020088728 | A | 11/2002 |
| KR | 100692653 | B1 | 3/2007 |
| KR | 20070037650 | A | 4/2007 |
| KR | 20070102698 | A | 10/2007 |
| KR | 20120045859 | A | 5/2012 |
| KR | 1020130045919 | A | 5/2013 |
| KR | 20130076798 | A | 7/2013 |
| KR | 20140055857 | A | 5/2014 |
| KR | 1020140074357 | A | 6/2014 |
| KR | 1020150013453 | A | 2/2015 |
| KR | 20150088494 | A | 8/2015 |
| KR | 101561108 | B1 | 10/2015 |
| KR | 101578193 | B1 | 12/2015 |
| KR | 20160056118 | A | 5/2016 |
| KR | 20160123069 | A | 10/2016 |
| KR | 20170010835 | A | 2/2017 |
| KR | 101743559 | B1 | 6/2017 |
| KR | 1020170063795 | A | 6/2017 |
| KR | 1020180019273 | A | 2/2018 |
| KR | 1020180030023 | A | 3/2018 |
| KR | 1020180032864 | A | 4/2018 |
| KR | 101910605 | B1 | 10/2018 |
| KR | 1020180132868 | A | 12/2018 |
| KR | 1020190036504 | A | 4/2019 |
| KR | 20190052541 | A | 5/2019 |
| KR | 20190073114 | A | 6/2019 |
| KR | 102119257 | B1 | 6/2020 |
| WO | 2014062337 | A1 | 4/2014 |
| WO | 2016057177 | A1 | 4/2016 |
| WO | 2016190641 | A1 | 12/2016 |
| WO | 2021060856 | A1 | 4/2021 |

OTHER PUBLICATIONS

Study and Implementation of Wireless Sensor Networks to Manage Energy in a Smart Home. Waliyi. (Year: 2017).*
CN1042874385. English Translation. (Year: 2015).*
CN 105471748. English Translation. (Year: 2015).*
CN107445011. English Translation. (Year: 2016).*
Border Gateway Protocol based Path Vector Mechanism for Inter-domain Routing in Software Defined Network Environment. Hassan. IEEE. (Year: 2016).*
CN107623635A. English Translation. (Year: 2020).*
Past before Future : A Comphrensive Review on Softwared Defined Networks Roadmap. Rankothge. Global Journals. (Year: 2019).*
Path Diversity for Inter-Domain Routing Security. Basit. IBCAST. (Year: 2017).*
Cloud Security Alliance, "SDP specification 1.0"; Software Defined Perimeter Working Group; Apr. 2014; 28 Pages.
Cloud Security Alliance, "Software-Defined Perimeter"; Architecture Guide; Mar. 10, 2020, Machine Translation; 43 Pages.
Japanese Office Action; Application No. 2021-039780; dated Jun. 8, 2021; 13 Pages.
Korean Notice of Allowance; Applicaiton No. KR 10-2020-0030721; dated May 2, 2021.
U.S. Notice of Allowance; U.S. Appl. No. 17/030,918; dated Mar. 29, 2021.
Korean Notice of Allowance; Application No. KR 10-2020-0105345; dated May 2, 2021.
Korean Office Action; Application No. 10-2020-0117543; dated Nov. 13, 2020; 6 pages.
U.S. Notice of Allowance; U.S. Appl. No. 17/030,918; dated Jan. 15, 2021; 33 pages.
U.S. Notice of Allowance; U.S. Appl. No. 17/359,800; dated Nov. 5, 2021; 50 Pages.
Extended European Search Report; Application No. 21162189.1; dated Jul. 16, 2021; 44 Pages.
U.S. Notice of Allowance; U.S. Appl. No. 16/580,866; dated Sep. 7, 2021; 9 Pages.
Japanese First Office Action; Application No. 2022-002658; dated Mar. 8, 2022; 10 Pages.

* cited by examiner

SECURE DATA TRANSMISSION USING A CONTROLLED NODE FLOW

TECHNICAL FIELD

The disclosed teachings generally relate to network security. The disclosed teachings more particularly relate to secure data transfer over a node flow.

BACKGROUND

Multiple network-accessible devices communicate data over a network. For example, a smartphone can communicate data to a server over the internet. In many cases, a device communicating over a public network (e.g., the internet) can transfer data to devices over a private network (e.g., an intranet) using a tunnel, such as a virtual private network (VPN) tunnel. The VPN tunnel transfers data between the device on a public network and devices in the private network with enhanced network security.

However, any number of applications executing on a device may be vulnerable to malicious data. For example, a smartphone can download an application with malicious data that may infect other devices in the network with malware. A device connected to a private network via a tunnel can allow unauthorized transmission of malicious data to secure devices in the private network. In other words, the device may be an untrusted device operating in an untrusted network. This may lead to the unauthorized access to secure data stored in devices across a network.

Figure 1:
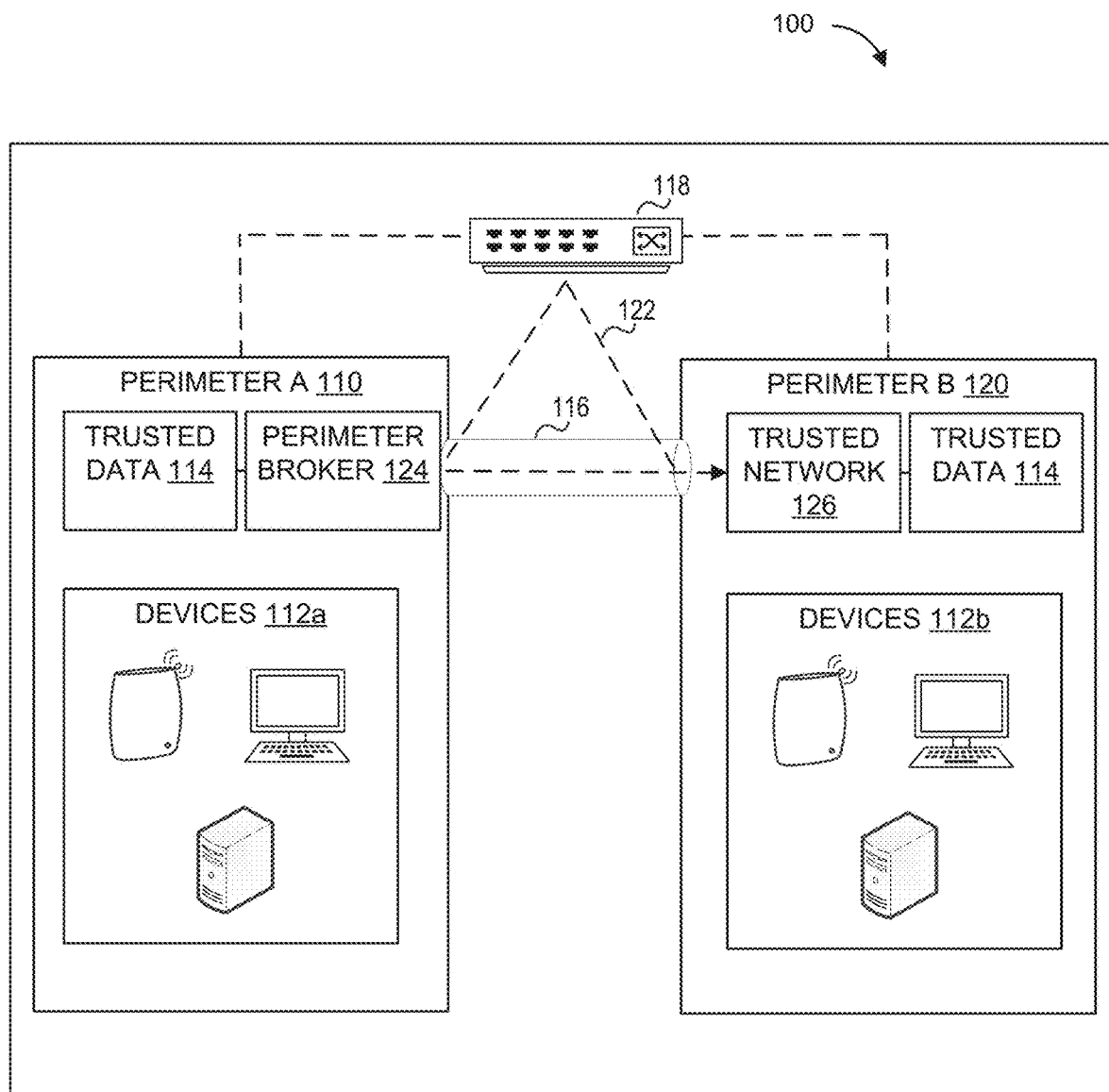
FIG. 1 illustrates an example of a defined perimeter and an on-demand trusted flow, in accordance with various embodiments.

The drawings and tables depict various embodiments for illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to establish control flows, node flows, and application flows, and facilitate secure transmission of data between nodes.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

Overview

Network security systems are implemented in network environments to manage and control data transmission. However, in many cases, network security systems provide ineffective control of data transmitted through a network. Many of these network security systems may be unable to securely exchange data anywhere at any time without any physical barriers.

Further, many internet protocol (IP) networks may be unable to identify and control various devices (e.g., mobile devices, internet of things (IoT) devices) within a network. With the adoption of cloud-based devices in networks, many IP networks may be unable to be unified for multiple cloud-based networks, resulting in difficulties in providing secure network management systems. Additionally, many IP networks may be unable to support a distributed network environment for applications, such as blockchain.

In addition, network-accessible devices (e.g., smartphone, servers) may include a plurality of applications executing on the network-accessible devices. However, such applications may become infected with malicious data. For example, an application with malicious code downloaded on a laptop computer may attempt to access private/secure data on the laptop computer or other devices in communication with the laptop computer.

Current technology allows a device to access devices on a secure network using an encrypted tunnel (e.g., VPN). A VPN may limit unauthorized interference with the transfer of data between the device and the private network that are connected via the VPN. However, if the device includes infected applications, infected/malicious data may be transferred to other devices in the private network via the VPN. This may leave the devices in the private network vulnerable to attack from the infected/malicious data transferred into the private network. Such devices and networks are considered zero-trusted devices and zero-trusted networks.

Various embodiments are described. As described in the application whitelist section, embodiments relate to network security systems that securely transfer and exchange trusted data between perimeters (or security elements). These network security systems may define a secure network perimeter that can include a defined virtual perimeter within a device, a data group, or a network unit. The network security system can allow only for secure data packet connections and flow of data transmission in the perimeter, which may be referred to a secure network flow.

In the network security system, only authorized applications may be allowed to connect to a target network. Only trusted (or "clean", or "sanitized") data may be allowed in the network, which may provide a reliable data exchange in the network. Particularly, a secure node flow may be established between a source node and a gateway. A controller may establish the node flow based on determining that an application of the source node is included on a whitelist of secure applications. The secure node flow creation process allows for secure transmission of data unique to each application of the source node, which may improve network security. Data may be securely and efficiently transmitted to a destination node via the node flow.

Additionally, the present embodiments relate to secure transmission of data using an application white flow. In addition to a node flow between the source node and a gateway, application flows may be established between the source node and destination node. Data may be securely and efficiently transmitted between the source node and destination node via the application flow.

Application Whitelist Overview

FIG. 1 illustrates an example of an architecture 100 including a defined perimeter and an on-demand trusted flow, in accordance with various embodiments. A defined perimeter may provide control of a security element for a perimeter unit by defining various virtual perimeters for a terminal, data group, or network unit. A defined perimeter can include one or more devices that are authorized or trusted to transmit information across the network.

As shown in FIG. 1, a network security system may include a first defined perimeter (perimeter A 110) and a second defined perimeter (perimeter B 120). Each defined perimeter can include one or more devices 112a-b (e.g., user devices, servers, internet of things (IoT) devices). The defined perimeters (e.g., perimeter A 110 and perimeter B 120) may transmit trusted data (e.g., trusted data 114) between the defined perimeters on a trusted flow 116 created between defined perimeters. Trusted data 114 may be directed to the trusted flow 116 via perimeter broker 124. The trusted data may be received from the trusted flow 116 at a trusted network 126. The defined perimeters 110, 120 may be connected or controlled by a perimeter controller 118, and the flow of data along the trusted flow 116 may define a defined perimeter 122.

To create a defined perimeter, converting management and identification systems can be converted from an IP-based system to a network element unit-based system. The defined perimeter can provide an identification scheme to identify various devices (e.g., mobile devices, IoT devices). The defined perimeter may provide a global IP address for multiple cloud-based devices and network integration and can create an identification scheme for a distributed network environment for various applications, such as blockchain-based applications. The defined perimeter may define virtual perimeter(s) for different environments for networks that are owned and others that are not owned. Since many IP networks are generally untrusted (i.e., many networks are publicly accessible), the defined perimeter may create a communication system between trusted devices by network segmentation by using the virtual perimeter.

Figure 2:
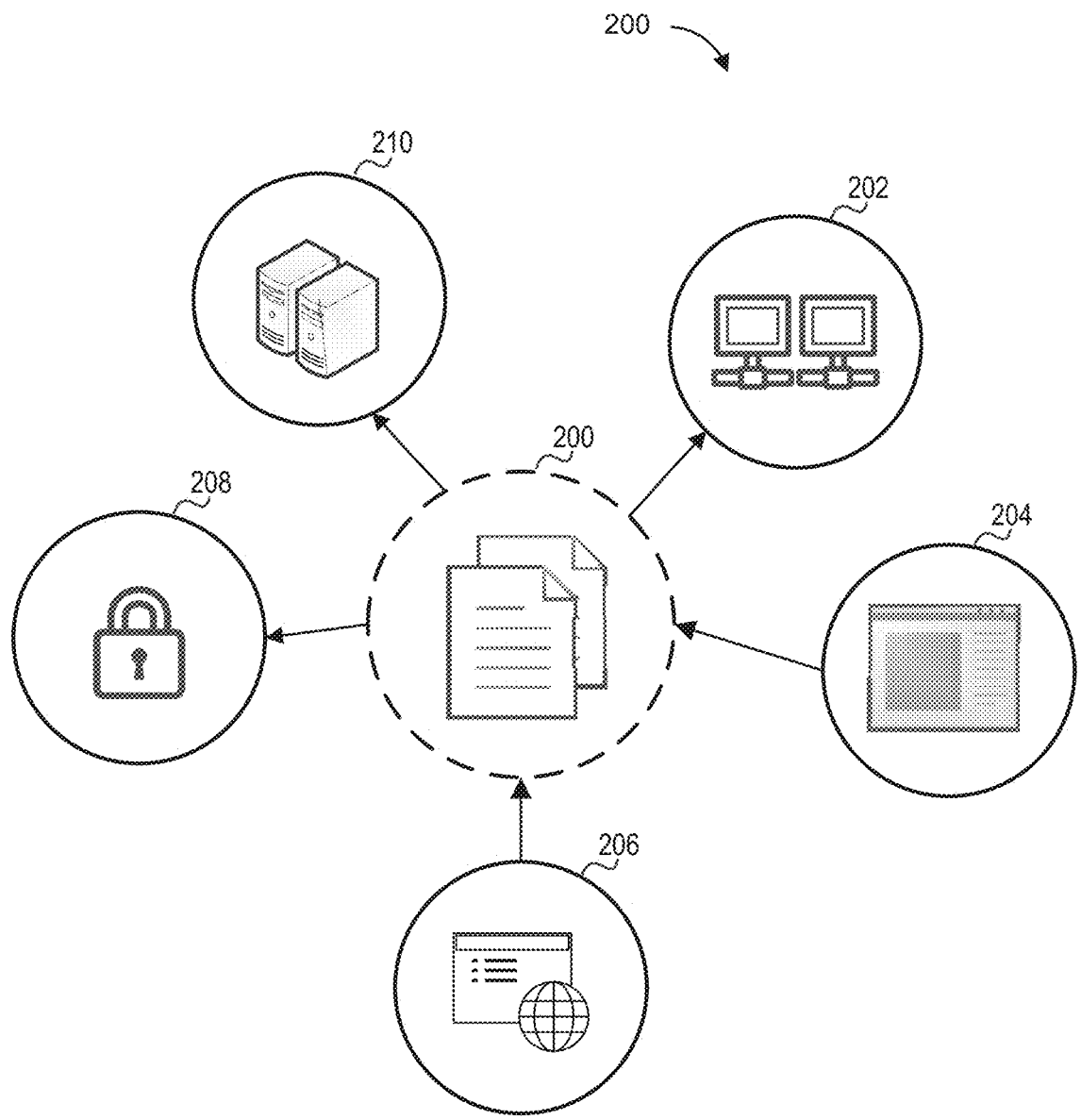
FIG. 2 illustrates a block diagram of a defined perimeter, in accordance with various embodiments.

FIG. 2 illustrates a block diagram 200 of a defined perimeter, in accordance with various embodiments. A defined perimeter 200 may include a security framework to segment network access to various devices/modules within a network. The defined perimeter may create connections between clients and the devices in the network that the client may access. The defined perimeter can provide a network barrier between secure/trusted devices/data and unsecure data.

The defined perimeter 200 can include multiple components, such as network security 202, data security 204, application security 206, endpoint/user certification 208, server security 210.

Figure 3:
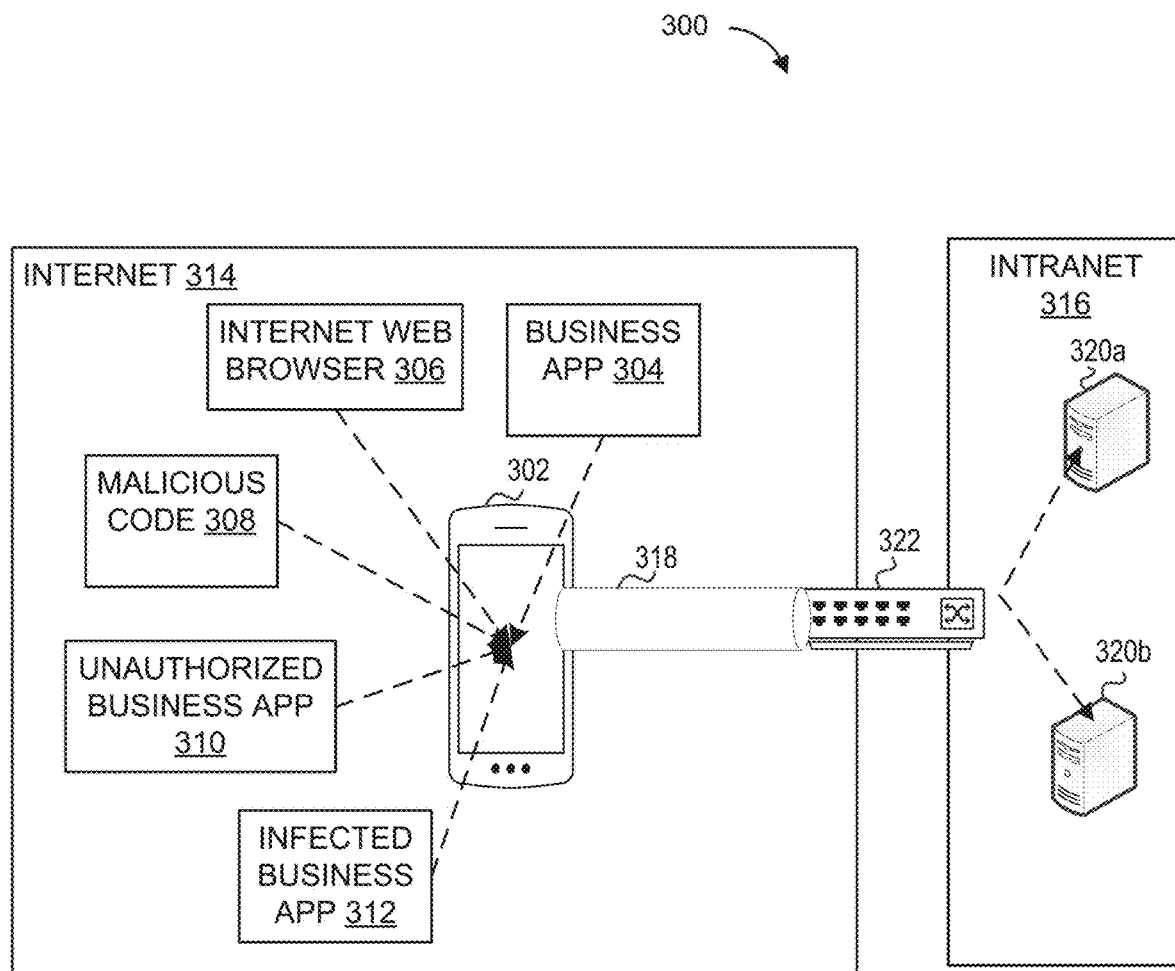
FIG. 3 illustrates an example block diagram of a perimeter broker application whitelist, in accordance with various embodiments.

FIG. 3 illustrates an example flow diagram 300 of a perimeter broker application whitelist, in accordance with various embodiments. A perimeter broker application whitelist may provide security against applications with malicious code by including a listing of secure/trusted applications executing on a device and disallowing the device to transfer data from unsecure/untrusted applications. In many cases, terminals such as terminal 302 have been exposed to variety of threats (e.g., malicious code, infected applications). Terminals connected to the network may be considered "hijacked" and may have access to security technology. After network access authorization, the terminal may be allowed to access all servers in the network. Accordingly, all devices in many networks may be vulnerable to attacks on the servers using malicious and unauthorized applications.

As shown in FIG. 3, terminal 302 can include information/applications (e.g., applications 304-312) that are either trusted or malicious/untrusted. For example, a first business application 304 may be trusted/authorized, and an infected business application 312 may be infected with malicious code or be unauthorized to transfer data through a network.

Terminal 302 with infected data/applications (or an "infected terminal") can use a suitable public network connection or a Virtual Private Network (VPN) to communicate across networks. For example, a terminal on a public network (e.g., internet 314) may access a private intranet network (e.g., intranet 316) using a VPN tunnel 318. In this example, the malicious code or infected application may inappropriately gain access to devices 320a-b and a VPN gateway 322 via the VPN tunnel 318.

An application whitelist can prevent infected/malicious applications from accessing devices included in a secure portion of a network (i.e. an intranet) by including a listing of secure/trusted applications executing on a device. Access to unauthorized applications (malicious code, etc.) in hijacked terminal environment may be blocked immediately upon detection.

Applications

Figure 4:
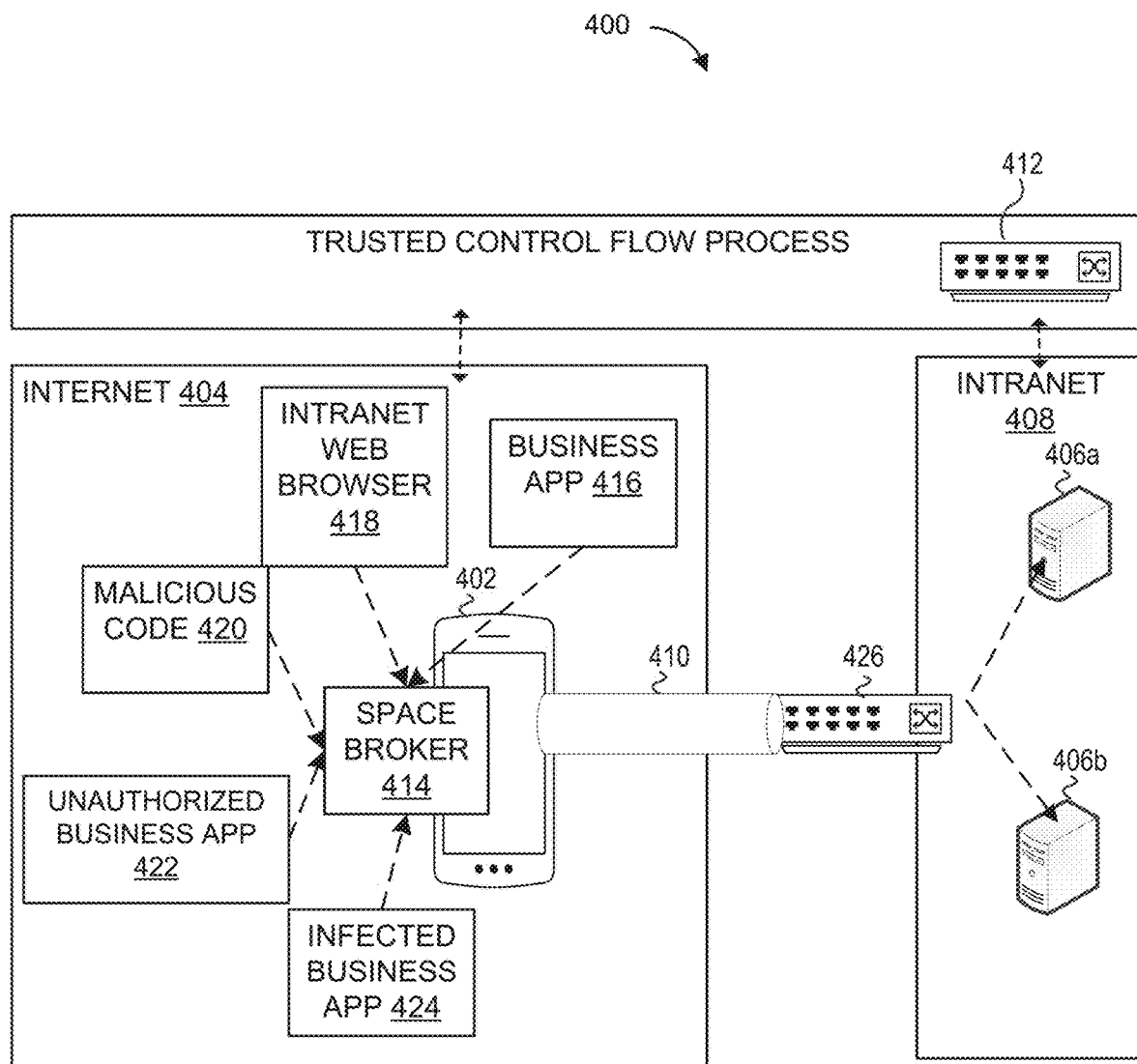
FIG. 4 illustrates a block diagram illustrating an application security example, in accordance with various embodiments.

FIG. 4 illustrates a block diagram 400 illustrating an application security example, in accordance with various embodiments. As shown in FIG. 4, a terminal 402 in a public network (e.g., the internet 404) may communicate with devices (e.g., devices 406a-b) in a trusted perimeter (e.g., intranet 408) via a trusted node flow 410.

A trusted control flow process can include perimeter creation and control. A perimeter controller 412 may identify devices included in various perimeters. For example, a first perimeter can include an unsecure network and a second perimeter can include a trusted network. The perimeter control may include blocking information from being transmitted across a network if a threat is detected. For example, if a malicious application is identified, data transmission from the malicious application may be blocked.

A device (e.g., a terminal 402) can include a perimeter broker 414. A perimeter broker 414 may include an application executing on the terminal that may control the transmission/receipt of information from various applications. The perimeter broker 414 can communicate with the perimeter gateway 426 to allow only trusted data to be transmitted on a trusted node flow 410. A perimeter broker 414 can identify trusted applications (e.g., business app 416, web browser 418), and untrusted applications (e.g., malicious code 420, unauthorized business app 422, infected business app 424) using the applications listed in the application whitelist. For example, if the perimeter broker 414 does not match a credential (e.g., IP address, identifier) associated with an untrusted application, the untrusted application may be unable to transfer data along the trusted node flow 410.

The system can transmit data from a trusted application along a network via a trusted node flow 410. A trusted node flow 410 can include an interconnect between multiple perimeters defined by the perimeter controller 412. For example, a terminal in an untrusted perimeter can connect to a trusted perimeter using a perimeter controller and a perimeter gateway over a trusted node flow. Accordingly, trusted data may be transmitted over the trusted node flow 410 to a device (e.g., web server 406*a*, business server 406*b*) included in the trusted perimeter (e.g., intranet 408).

As an example, a system can provide secure connection to an authorized network from an authorized application in an isolated perimeter. Elements such as perimeter control, terminal control and flow control provide secure network access-based services in an unsecured network environment.

Perimeter control can include configuring a task specific, public cloud and internet based virtual perimeter. Terminal control can include encrypting only data of authorized applications before transmission. Flow control can include connecting only authorized network flows to a target network, and any unauthorized applications can be blocked.

Figure 5:
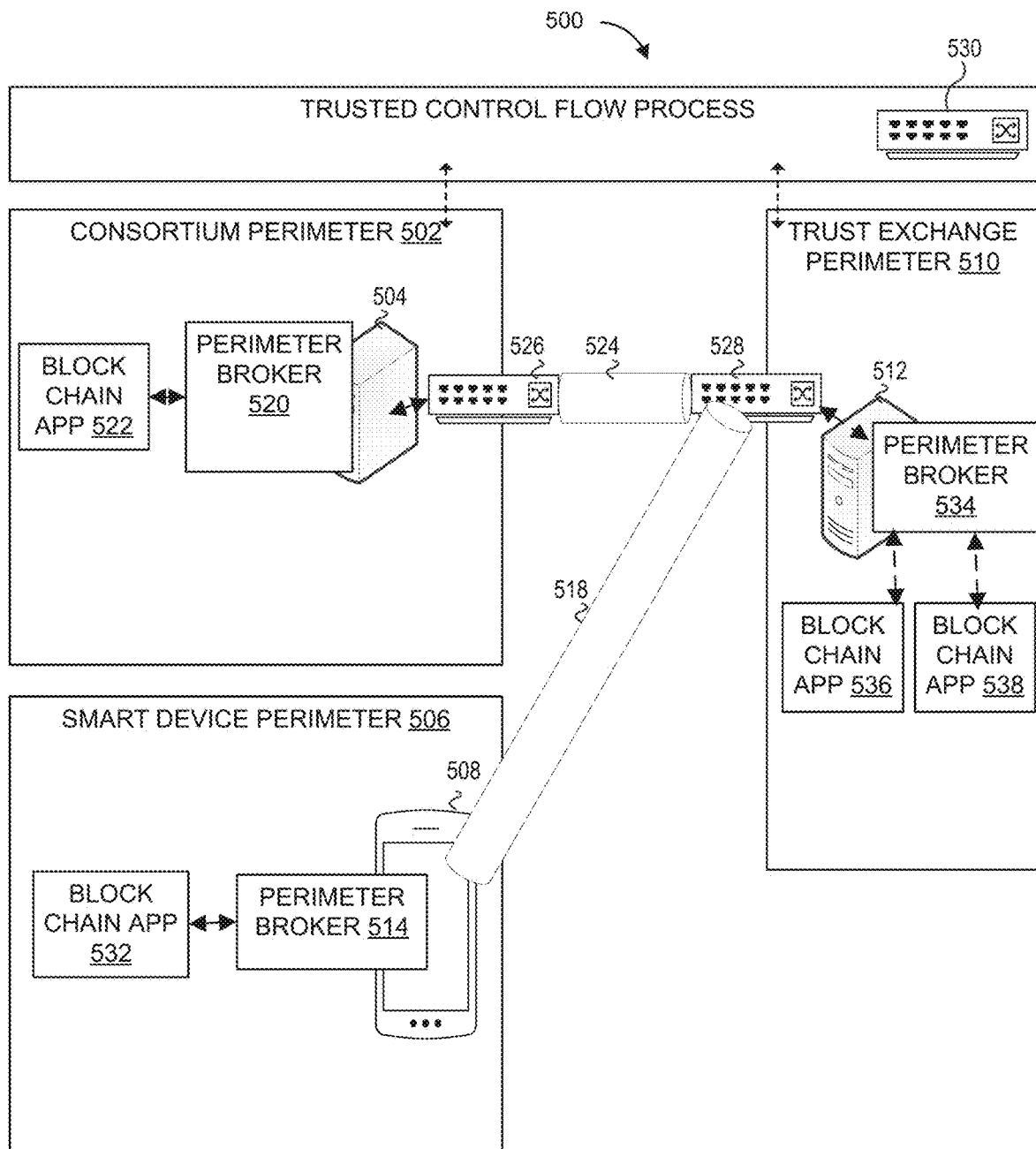
FIG. 5 illustrates a block diagram of a data security application example, in accordance with various embodiments.

FIG. 5 illustrates a block diagram 500 of a data security application example, in accordance with various embodiments. In FIG. 5, multiple perimeters may be defined and created. For example, a consortium perimeter 502 can include a blockchain network executing on a blockchain server 504, a smart device perimeter 506 can include a smart device 508 executing over a blockchain network, and a trust exchange perimeter 510 can include a blockchain server 512 executing over a blockchain network.

In some embodiments, a smart device 508 may include a perimeter broker 514 that allows a whitelisted application to transmit data from a whitelisted application (e.g., block chain app 532) over a trusted node flow 518. Additionally, a server 504 may include a perimeter broker 520 that may communicate trusted data from a whitelisted application (e.g., block chain app 522) over a second trusted node flow 524 between the consortium perimeter 502 and the trusted exchange perimeter 510. As shown, the system can define multiple perimeters for devices in a network, and a trusted node flow can be created between the devices and a trusted secure network (e.g., a trust exchange perimeter). The trusted node flow 518, 524 can include a connection between perimeter gateways (e.g., perimeter gateway 526 and perimeter gateway 528). A control flow can be established between perimeters (e.g., consortium perimeter 502 and trust exchange perimeter 510) via perimeter controller 530.

In some embodiments, a perimeter may include a blockchain network. For example, an application utilizing blockchain techniques may transmit data along the trusted node flow to a trusted perimeter. The trusted perimeter can include a blockchain server with a perimeter broker that accesses a blockchain application for collaboration and a second blockchain application for IoT. The smart device 508 may include a blockchain application 532 executing on the smart device 508. The blockchain server 512 may include a perimeter broker 534 that may be a security application executing on the blockchain server 512. The perimeter broker 534 may connect to multiple blockchain applications 536, 538 for various functionality (e.g., for collaboration, for IoT).

The example in FIG. 5 provides clean data generation and secure data transfer systems in an isolated perimeter. Blockchain, or another similar decentralized listing of records, may provide a trusted chain of data in the blockchain to provide secure data transfer.

Each blockchain data element can include a dedicated network configuration (virtual perimeter that are controlled by a perimeter controller).

A perimeter controller may include elements in a network that manage the overall connectivity devices and its security. A device perimeter may include terminals/devices that are either connected to each other or connected to other servers. A blockchain perimeter may include servers that perform processing and storage tasks relating to created/maintained blockchains that include various information. A storage perimeter may include one or more types of storage devices. A server perimeter may include servers that perform computing/processing tasks with various applications.

Any perimeter may include one or more elements. An element may include a perimeter controller (or simply "controller") which can access and monitor an application whitelist and determine authorized applications by inspecting the whitelist. The perimeter controller may connect to various defined perimeters and include a listing of authorized applications in the application whitelist.

An element may include an authentication server that may be responsible for the authorization of additional devices in the network. The authentication server may include an active directory of authorized devices and may be associated with an organization. A trusted perimeter gateway can facilitate a connection between multiple devices in one or more perimeters. One or more perimeter gateways may be included in a network.

An element may include a trusted node. A trusted node may include a device, terminal, server, etc., that may transmit and receive data. A trusted node may be a source node requesting connection to a network. Another trusted node may be a destination node (e.g., device, server, gateway) that may receive a connection request from the source node and establish a connection between the trusted nodes.

An element can include a perimeter security application. The perimeter security application may execute on a node or authorization server that manages the security on a device. For example, the perimeter security application may selectively allow data transfer between trusted nodes and trusted applications included in an application whitelist.

An element may include a control flow. A control flow may include an IPSec-encrypted tunnel that connects a perimeter controller and a trusted node to facilitate secure data transfer.

An element may include a node flow. A node flow may include an IPSec encrypted tunnel between a trusted node and a trusted perimeter gateway or with another trusted node where data is securely exchanged.

Figure 6:
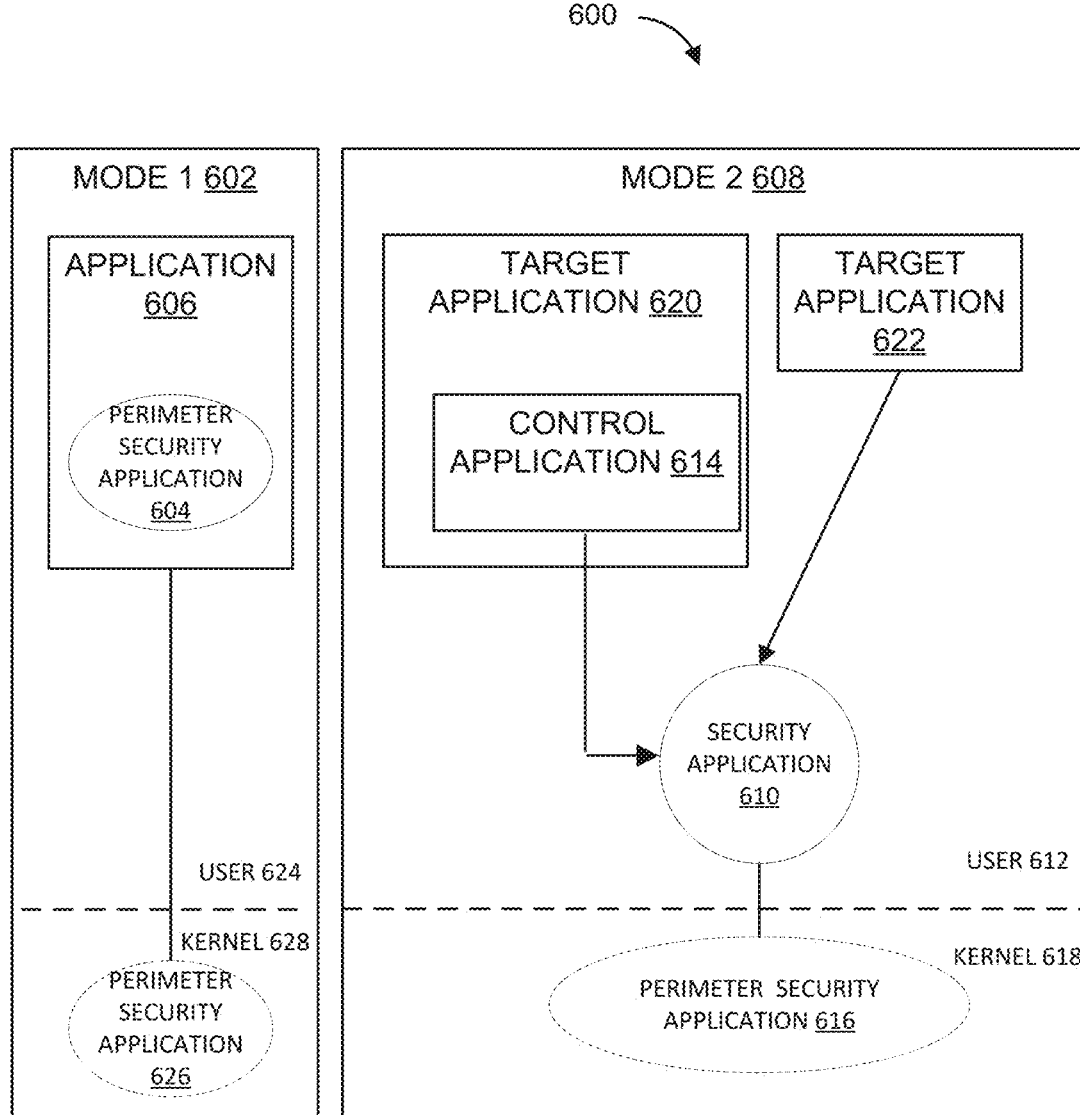
FIG. 6 illustrates a block diagram of a perimeter security application, in accordance with various embodiments.

FIG. 6 illustrates a block diagram 600 of a perimeter security application, in accordance with various embodiments. As shown in FIG. 6, a network may include multiple modes. A first mode 602 may include a perimeter security application 604 that is embedded within the application 606 provided in the user 624 part of the system. The first mode 602 may include an application 606 that stores/accesses the perimeter security application 604. The first mode 602 may include a perimeter security application 626 in a kernel 628.

A second mode 608 may include a perimeter security application 610 executing in a user perimeter 612, where a control application 614 may be monitored and checked (e.g. the target application 620, 622 may include a web browser, where the control application may be running within the web browser). In some embodiments, the companion part of the perimeter security application 616 in the kernel 618 is optional.

Control Flow Creation

Figure 7:
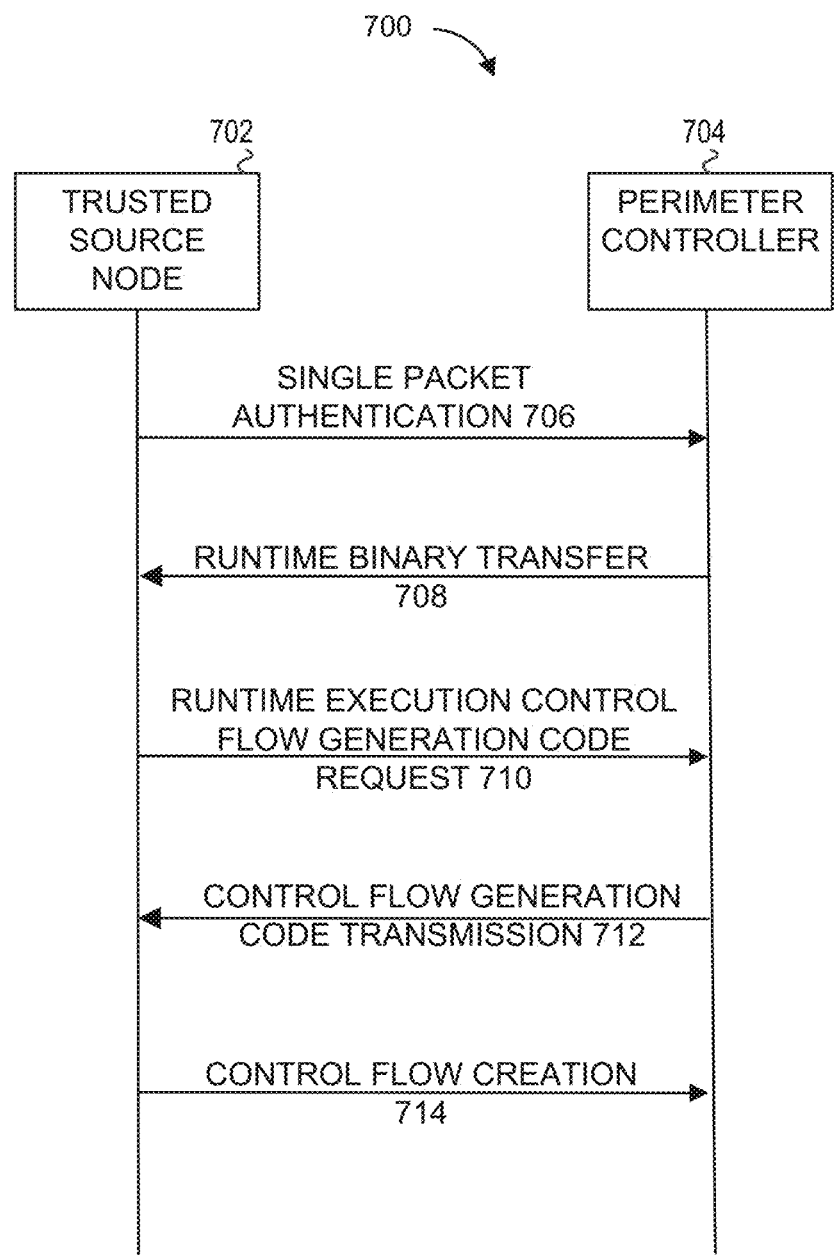
FIG. 7 illustrates a signaling process for creating a control flow between a trusted node and a perimeter controller, in accordance with various embodiments.

FIG. 7 illustrates a signaling process 700 for creating a control flow between a trusted node 702 and a perimeter controller 704, in accordance with various embodiments. The trusted node 702 may transmit a single packet authentication (SPA) message 706 to the perimeter controller 704. The SPA message 706 may represent a request for the trusted node to connect to a target node, where the SPA message 706 includes a request to create a node flow between the trusted node and the target node.

The SPA message 706 can use a defined perimeter as defined by, e.g., Cloud Security Alliance® (CSA). The perimeter controller 704 may validate the data sent by the trusted node based on a validation algorithm applied to the application sending the data. The perimeter controller 704 may validate that the application is currently supported (i.e., is listed in the application whitelist).

The SPA message 706 may utilize an application signature one time password (OTP) seed, where the message includes an OTP value and a SPA application identifier. The SPA message 706 may include built-in encryption keys to encrypt any communication between the trusted node and perimeter controller.

The perimeter controller 704 can transmit a runtime binary transfer message 708 to the trusted node 702. Once a request from a trusted node has been validated, a binary code may be generated and sent to the trusted node for execution. The binary code may include information to create the control flow and other information related to the handshake for this process, such as a temporary token or encryption key. The binary code may be generated every time the trusted node requests a connection. In some embodiments, the runtime binary transfer message is optional. The runtime binary transfer may update a runtime module.

The trusted node 702 can transmit a runtime execution control flow generation code request 710 to the perimeter controller. Upon receiving the binary code, the trusted node may execute it and send the execution results to the perimeter controller. The results may be sent within a predetermined time period. If the results are sent after the expiry of a time period, the temporary token may expire, and the control flow may not be established. In some embodiments, the results being sent after the expiry of a time period is an indication that the trusted node is compromised. By checking the results of the execution code, the perimeter controller can verify that the perimeter security application is running normally and will run normally when it uses the control flow to send a periodic security code. In some embodiments, the runtime execution control flow generation code request may be optional. The runtime execution control flow generation code request may include a runtime execution result indication whether any of basic application detection or tamper detection.

The perimeter controller 704 may transmit a control flow generation code transmission 712 to the trusted node 702. If the authentication is successful, the perimeter controller can send a generation code to the trusted node. The generation code may include detailed information for control flow creation, such as a control flow identifier, a port number, etc. The control flow generation code transmission may include any of a pre-shred key for tunnel creation, a control flow identifier, and port information for tunnel creation.

The trusted source node 702 may transmit a control flow creation message 714 to the perimeter controller 704 indicating that the control flow is established. The control flow creation may be included in data transmission between the trusted node and the perimeter controller. The control flow creation may include an IP overlay information setting, a pre-shared key-based tunnel creation, and an on-demand security code execution. When the trusted node and perimeter controller connects via the control flow, the trusted node may send information that includes a checksum, a fingerprint of the security application, etc. Any of the trusted node and perimeter controller can use any of the IP, port number, control flow identifier, etc., when the flow is created. Once this step is completed, the perimeter controller may use this control flow to send periodic security codes to execute on the trusted node and receive its results.

Flow Processing

Once a control flow is created, the perimeter controller may use the control flow to send periodic security codes to trusted nodes to receive results from the trusted nodes. Also, since the security binary code given to the trusted node may not exist during trusted node creation process, this may prevent the control flow from being tampered with. The perimeter controller can be set up to send a security code at specific time, or based on the occurrence of a specific event, or based on the policies established for the perimeter controller.

A perimeter security code can be modified or changed. A flag may be transmitted as part of a transmission to indicate to a trusted node whether to discard an old code and use a new code or use both the old code and new code. Each time the perimeter security code is received by a trusted node, the perimeter controller may place it at different locations in memory to prevent tampering of the perimeter security code. Also, the encryption/decryption keys may constantly change for a security code with every download, which may further prevent tampering of a security application.

Unlike some security solutions where an update is performed only once, this process of constantly updating the security code and running it repeatedly may assist in maintaining a secure network connection (control flow) between the perimeter controller and the trusted node.

In addition to this processing, the perimeter controller may verify additional security elements on the trusted node on demand so that it can respond to any real time threat.

If a threat is detected during any of the above discussed operations, the control flow may be taken down and the process of creating the control flow can start again. All network connections related to the control flow can be disconnected.

Figure 8A:
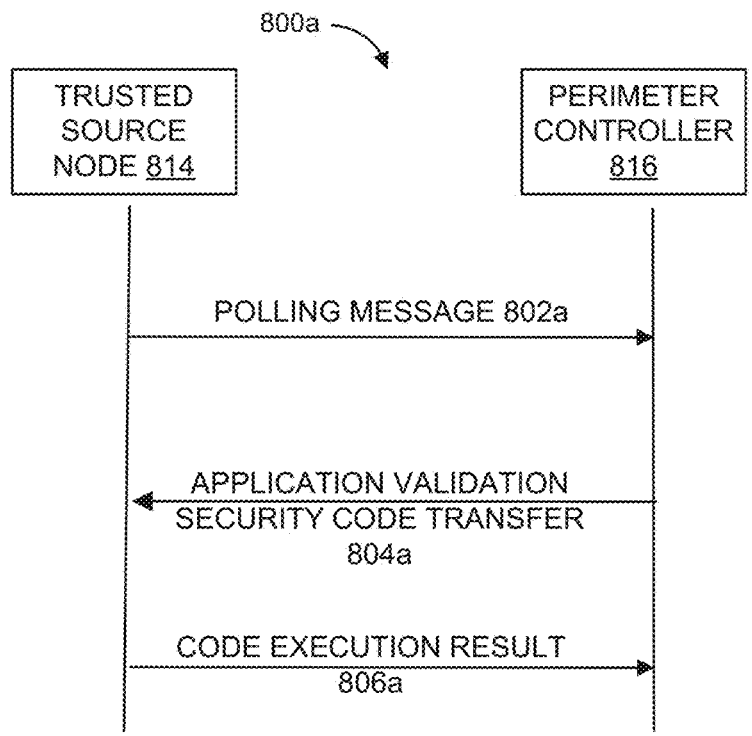
FIG. 8A illustrates a signaling process for an application verification process, in accordance with various embodiments.

FIG. 8A illustrates a signaling process 800a for an application verification process, in accordance with various embodiments. A trusted node 814 may communicate a polling message 802a to the perimeter controller 816. The polling message 802a may include a request to determine whether a command exists (or a "client pull request"). The polling message 802a may include a request to check if a connection is maintained.

The perimeter controller 816 can transmit an application validation security code transfer message 804a to the trusted node 814. The perimeter controller can generate a security code that detects the validity of the control application based on the authentication information generated above. This code may include various functions to detect tampering of the control application. For example, it may be possible to insert various kinds of identification information which can be verified by utilizing control application information (e.g., file location, registry, signature, fingerprint). The application validation security code transfer message may include a security application control code.

The trusted node 814 can transmit a code execution result 806_a_ to the perimeter controller 816. The node may execute the security code sent by the perimeter controller and send the results via the control flow. The perimeter controller may verify the control application identification and verifies the application data. If the system detects a threat during this verification, all network connections related to the control flow identifier can be terminated.

Figure 8B:
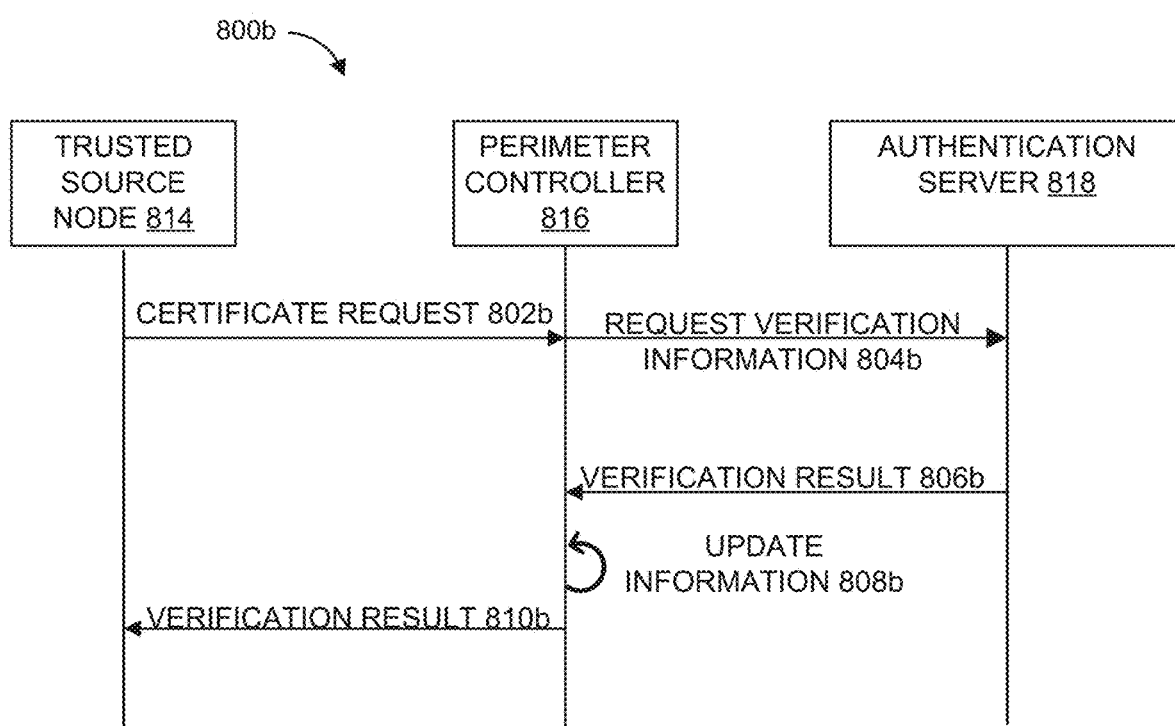
FIG. 8B illustrates a signaling process for a user validation process, in accordance with various embodiments.

FIG. 8B illustrates a signaling process 800_b_ for a user validation process, in accordance with various embodiments. The trusted node 814 may request a certificate from an authentication server 818 by transmitting a request 802_b_ to a perimeter controller 816. The request 802_b_ may include a user identifier and a password. The trusted node 814 may receive authentication information from the user and terminal that was not collected in a previous processing for application whitelist.

The perimeter controller 816 may request verification information 804_b_ based on the information received from the trusted node. The perimeter controller 816 may verify the validity of the information received from the trusted node.

The authentication server 818 may transmit a verification result 806_b_ to the perimeter controller 816. The verification result may indicate whether the trusted node is verified.

The perimeter controller 816 may update information 808_b_ relating to the trusted node. The perimeter controller 816 may generate an additional security code if additional authentication is needed and may send it to the trusted node so that it can run this additional code. The perimeter controller can identify which application the trusted node is authorized to use based on the application whitelist stored on the perimeter controller.

A verification result 810_b_ may be transmitted from the perimeter controller 816 to the trusted node 814. The verification result 810_b_ can identify whether applications included in the trusted node are authorized to transfer data. In some embodiments, the system can utilize multifactor authentication.

Node Flow Creation

Figure 9A:
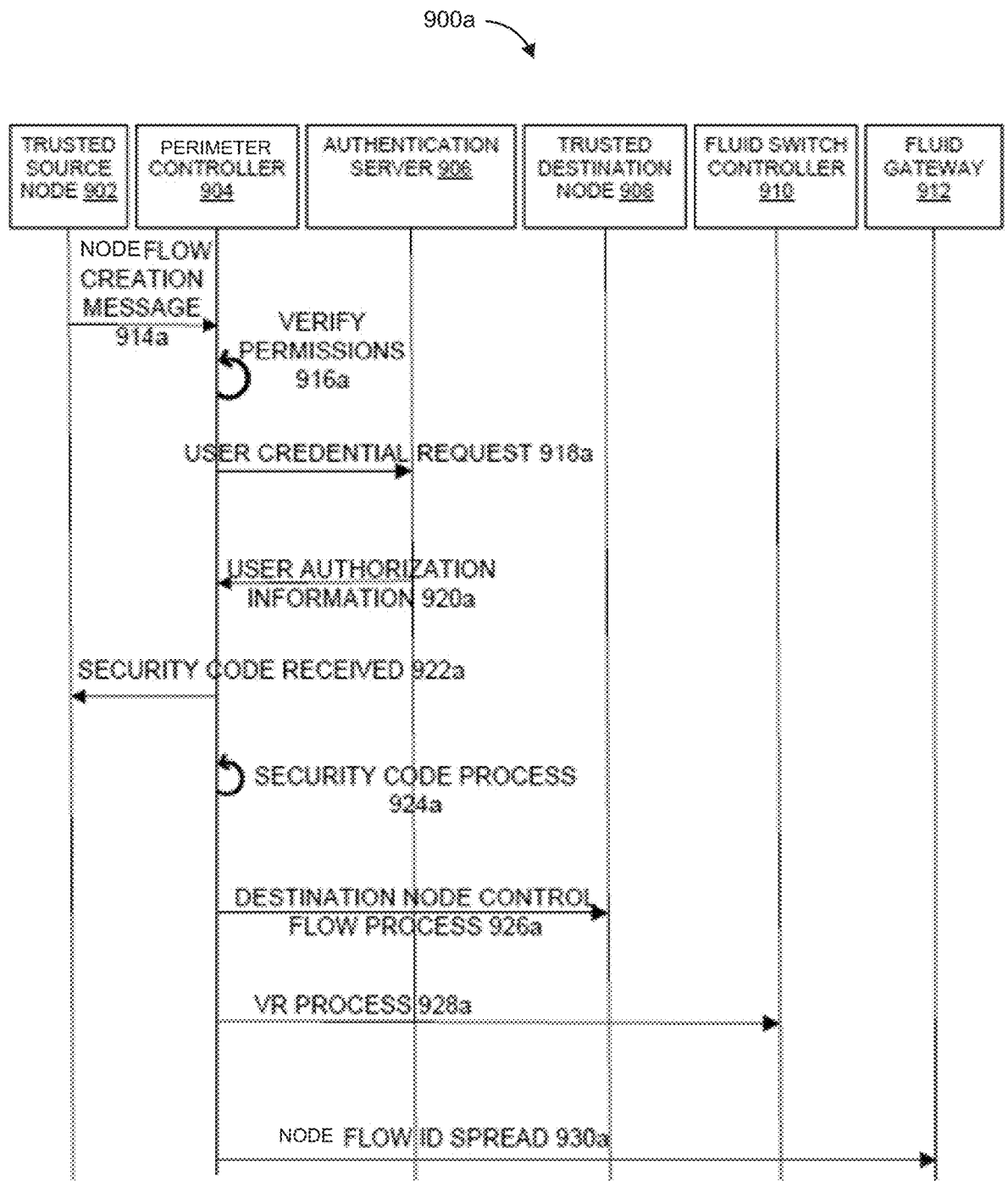
FIG. 9A illustrates a signaling process for creating a node flow, in accordance with various embodiments.

FIG. 9A illustrates a signaling process 900_a_ for creating a node flow, in accordance with various embodiments. A trusted node 902 may transmit a node flow creation request 914_a_ to a perimeter controller 904. The node flow creation request 914_a_ may include a destination node IP address and a target application. On the source node, the security application may identify the destination node IP and port that the control application wants to access. The security application can provide appropriate application programming interfaces (APIs) to perform this function. Also, the system can check to ensure that there is no existing node flow to the destination node. The control flow can be used to send the information to the perimeter controller.

The perimeter controller 904 can verify permissions 916_a_ based on the received information in the node flow creation request. The perimeter controller may check a policy perimeter to verify the permissions and the requested destination node information. The perimeter controller may check the network control policy to make sure that the request adheres to at least one defined policy.

In some embodiments, the perimeter controller 904 may send user request credentials 918_a_ (e.g., a user identifier, a destination node IP, a target application) to an authentication server 906. To validate a node flow creation request, the perimeter controller 904 may consult with the authentication server to verify the validity of the request. This may ensure that the application is defined in the application whitelist.

In some embodiments, the authentication server 906 may send user authorization information 920_a_ to the perimeter controller 904. This information may include accessible perimeter and network information and a list of accessible applications. The perimeter controller 904 may send a security code 922_a_ to the trusted source node 902.

The perimeter controller 904 may initiate a security code process 924_a_ to create a node flow if a security privilege exists. The perimeter controller upon receiving the initiation of the security code process can generate a security code for the creation of the node flow. The information included in this security code may include any of a node flow identifier, a gateway IP (address of the gateway that will be between the source and destination node), a port number, and appropriate encryption keys or predefined shared keys.

In some embodiments, the perimeter controller 904 transmits a destination node control flow process 926_a_ to the trusted designation node 908. The perimeter controller 904 may initiate a process of setting up a control flow to the destination node and then send the generated security code.

In some embodiments, a seventh operation may include a virtual routing (VR) process 928_a_. If virtual routing is to be performed, then appropriate information may be sent to a perimeter switch controller 910 and a gateway 912.

A node flow ID spread 930_a_ may be sent from the perimeter controller 904 to the perimeter gateway 912. The node flow ID spread may include a node flow ID, a destination node IP, a pre-shared key, and VR information. Appropriate information including the node flow ID may be sent to the perimeter gateway for the upcoming node flow creation. The security code generated may be sent to the source node creating the node flow.

Figure 9B:
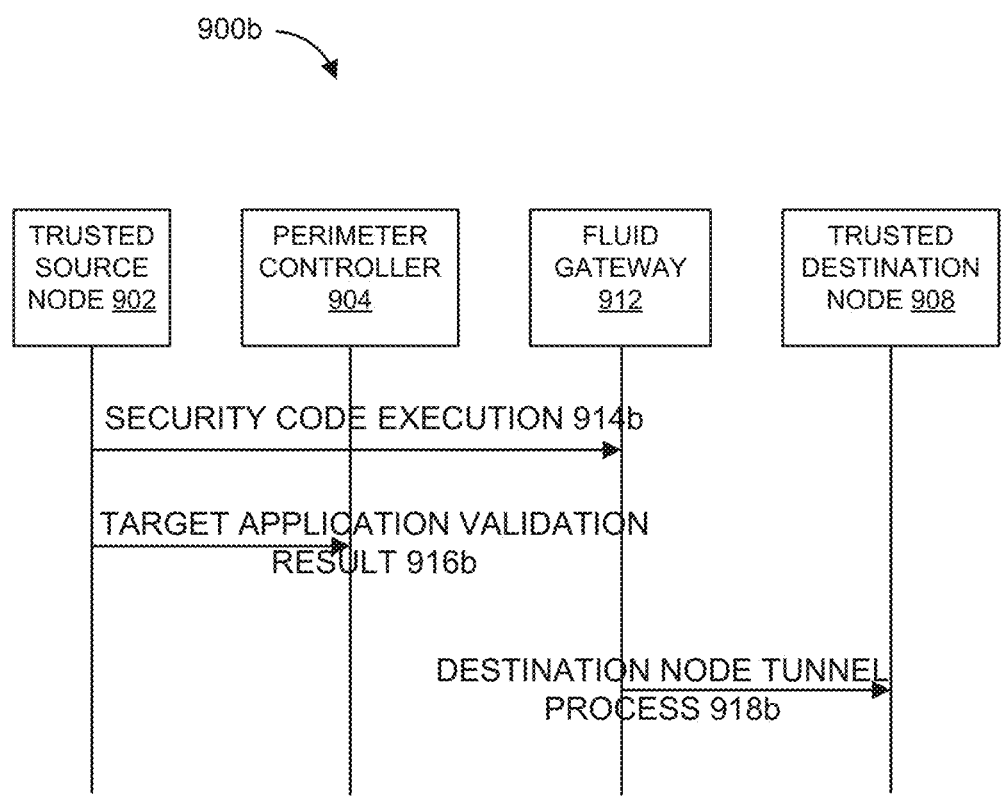
FIG. 9B illustrates a signaling process for creating a node flow, in accordance with various embodiments.

FIG. 9B illustrates a signaling process 900_b_ for creating a node flow, in accordance with various embodiments. As shown in FIG. 9B, trusted source node 902 may execute a security code 914_b_ to the fluid gateway 912. The perimeter security application on the trusted source node 902 can implement security code, which will allow it to create an encrypted tunnel to the perimeter gateway, or it may create a regular tunnel if the security code includes plain text.

A trusted source node 902 may transmit a target application validation result 916_b_ to the controller 904 The security application on the source node may send the results of the execution of the security code to the controller. The source node may keep sending information to the controller as long as the node flow is active.

A fluid gateway 912 may transmit a destination node tunnel process 918_b_ to a destination node 908. The gateway may create an encrypted tunnel to the destination node. The encrypted tunnel may facilitate communication between the source node, the gateway, and the destination node. Using this process, only the authorized applications can send data through the node flow to the target gateway, and unauthorized applications may be prevented by the security application to send the packet to the target gateway.

Figure 10:
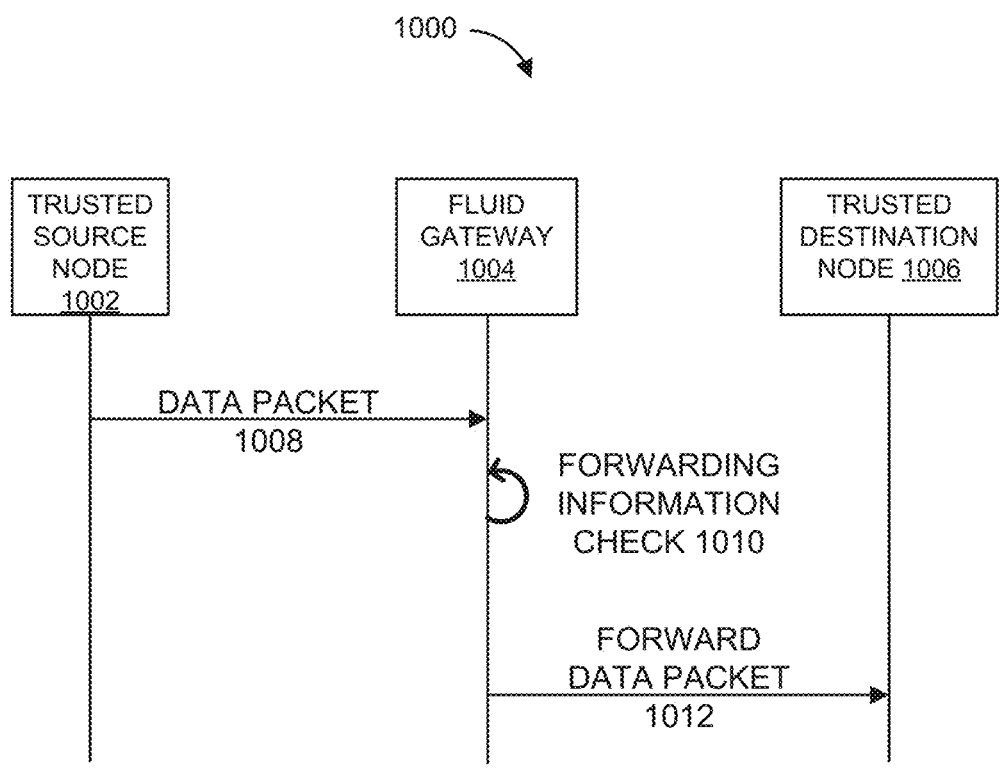
FIG. 10 illustrates a signaling process for packet forwarding using a node flow, in accordance with various embodiments.

FIG. 10 illustrates a signaling process 1000 for packet forwarding using a node flow, in accordance with various embodiments. A trusted source node 1002 may transmit a data packet 1008 to a gateway 1004. The data packet may include IPSec and a flow ID. The security application on the trusted source node 1002 may add the flow ID and encrypt the packet using the keys provided (assumption is that encryption is required policy as defined on the perimeter controller). This encrypted packet may be sent to the target gateway.

The gateway 1004 may perform a forwarding information check 1010. The forwarding information check may include determining any of: whether a flow ID exists, a decryption status, a VR ID check, and whether an IP header was modified. When the gateway receives the packet, it may extract the flow ID and validate it against the corresponding node flow information it received from a controller.

If the flow ID information does not match, the packet may be dropped. Also, the controller may request the control ID associated with the node flow ID to be discarded. Once this happens, all network connections associated with the trusted source node may be blocked.

If the gateway cannot find the flow ID, it may request the information from the controller. If the flow ID is not found on the controller, the packet can be dropped. If the flow ID is found on the controller, the controller can send the associated information the gateway. If VR was used, then the controller may validate VR information and use it for forwarding the packet to the destination node. If the packet is valid, then the gateway may modify the header information to send it to the destination node.

The data packet may be forwarded 1012 to a trusted destination node 1006. Depending on the connection status between the gateway and the destination node, and the information configured by the controller for this connection, the gateway may perform decryption of the packet and forward the packet as plain text to the destination node. If the destination node can handle decryption, the packet may be sent as is.

Figure 11:
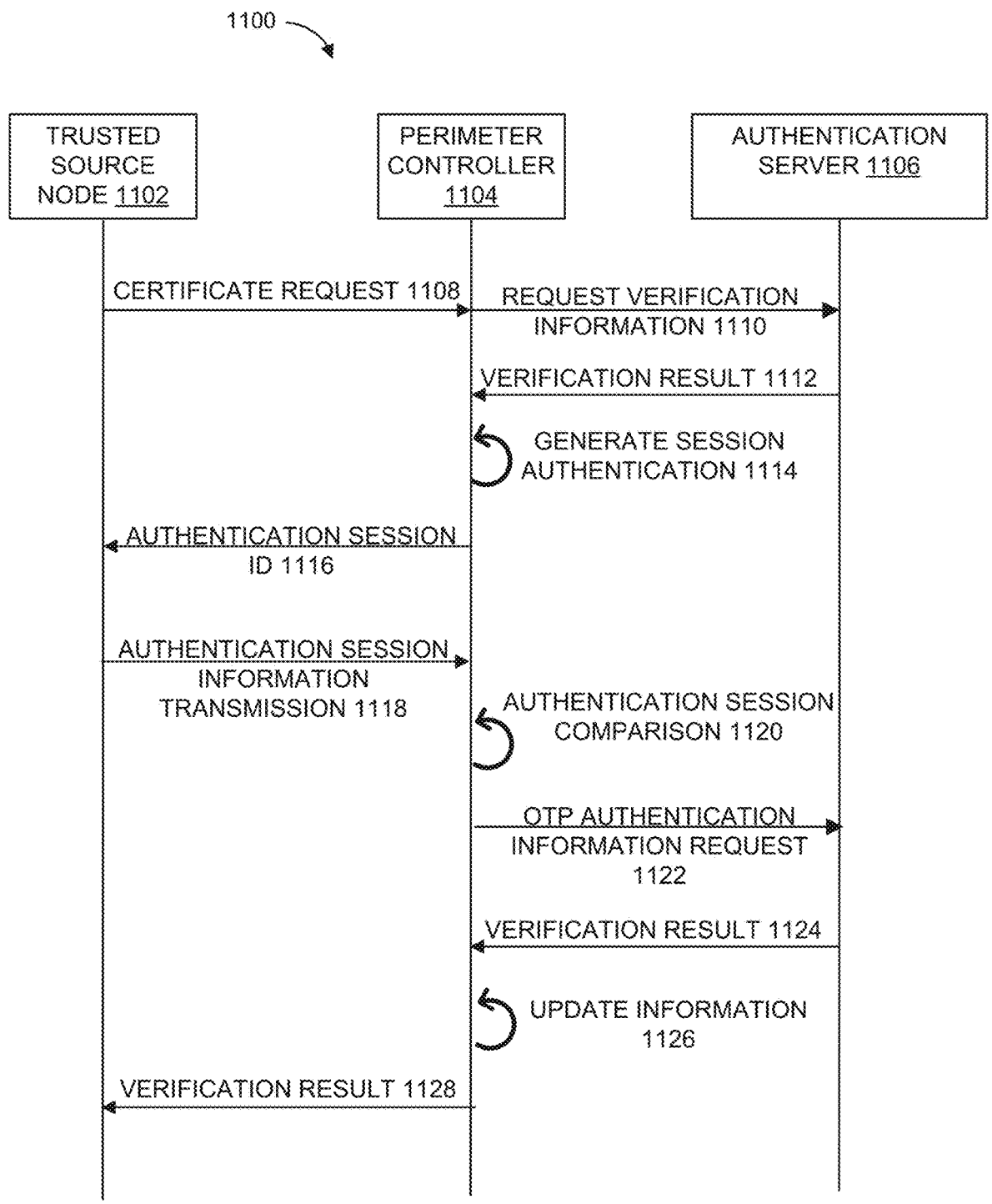
FIG. 11 illustrates a signaling process for multifactor authentication, in accordance with various embodiments.

FIG. 11 illustrates a signaling process 1100 for multifactor authentication, in accordance with various embodiments. A first operation may include a trusted source node 1102 requesting a certificate 1108 to a perimeter controller 1104 (or controller 1104). The request may include a user identifier and a password.

In a second operation, a controller 1104 may send a request for verification information 1110 to an authentication server 1106. The request for verification information may include a user identifier and password.

In a third operation, the authentication server 1106 may send a verification result 1112 to the controller 1104. The verification result may indicate whether the trusted source node is authenticated.

In a fourth operation, the controller 1104 may generate multi factor authentication (MFA) session authentication information 1114.

In a fifth operation, the controller 1104 may send an authentication session ID 1116 to the trusted source node 1102. The authentication session ID may show as a QR.

In a sixth operation, the trusted source node 1102 may send authentication session information 1118 to the controller 1104. The authentication session information may include a QR code scan with session ID. In some embodiments, the QR code scan is based on the user ID and a telephone number and a result of an OTP seed.

In a seventh operation, the controller 1104 may perform an authentication session comparison 1120 based on authentication session information received from the trusted source node. This may include transmitting an OTP authentication information request 1122 to the authentication server 1106. The OTP authentication information request 1122 may include a user ID and a telephone number based on the OTP seed result value identified.

In an eighth operation, the authentication server 1106 may send a verification result 1124 to the controller indicating whether the authentication session information is valid.

In a ninth operation, the controller 1104 may identify update information 1126 based on the verification result. The update information may include a user ID, a device ID, and credential mapping.

In a tenth operation, the controller 1104 may send a verification result 1128 to the trusted source node 1102.

Figure 12:
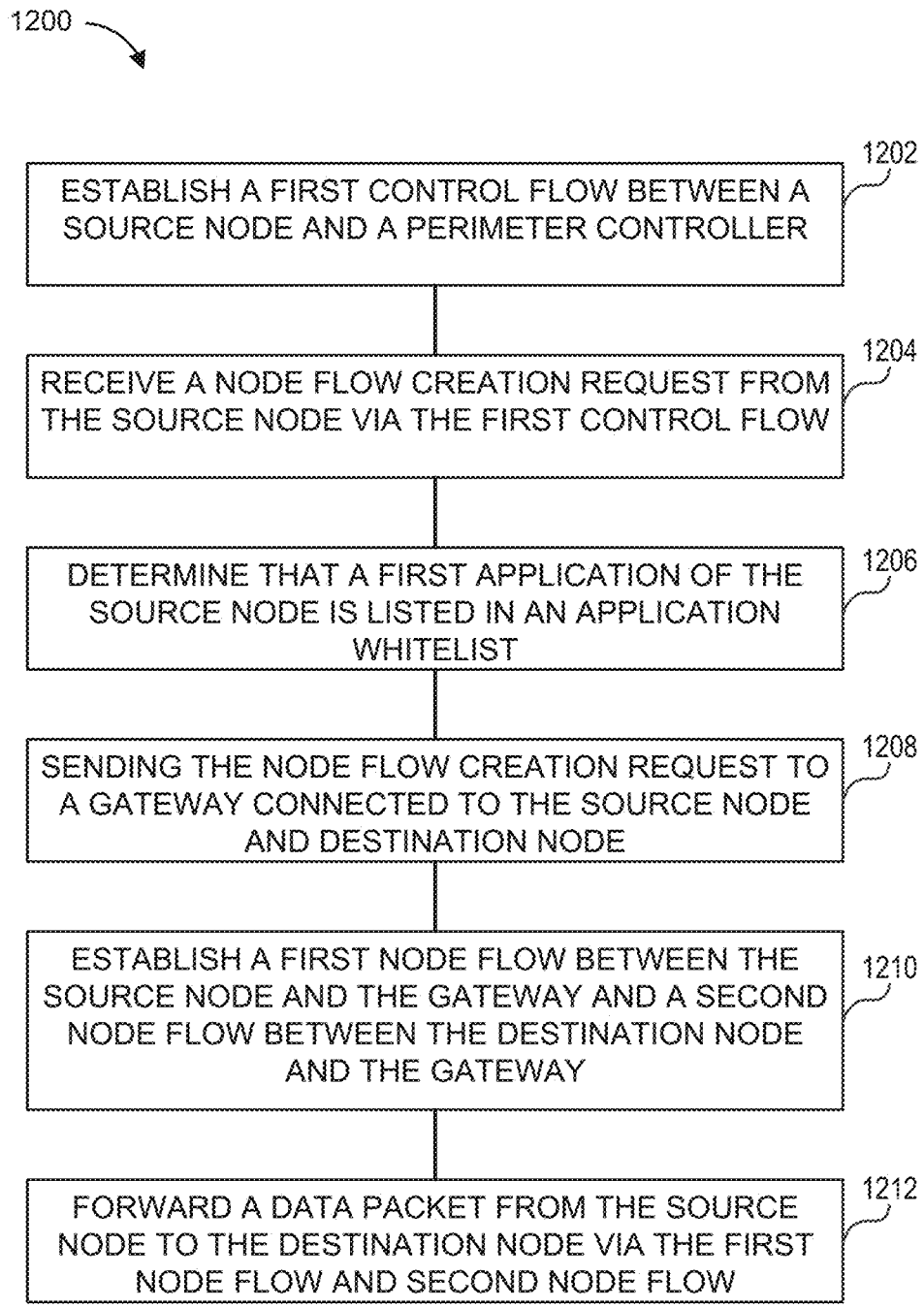
FIG. 12 illustrates a block diagram of a method to facilitate secure transfer of data between a source node and a destination node, in accordance with various embodiments.

FIG. 12 illustrates a block diagram of a method 1200 to facilitate secure transfer of data between a source node and a destination node, in accordance with various embodiments.

The method 1200 may include establishing a first control flow between the source node and a perimeter controller (or controller) (block 1202). Establishing the first control flow may include receiving a control flow creation request from the source node. The control flow creation request can include single packet authorization information identifying a security application executing on the source node. Establishing the first control flow may also include inspecting the single packet authorization information to determine whether the security application executing on the source node is authorized to establish the first control flow with the controller. In response to determining that the security application is authorized to establish the first control flow with the controller, establishing the first control flow can also include sending control flow information to the source node, where the control flow information is configured to facilitate establishing the first control flow.

In some embodiments, the method 1200 may include transmitting a runtime binary transfer message to the source node in response to determining that the security application is authorized to establish the first control flow with the controller. The runtime binary transfer message can include a security binary code and a temporary token. The system can also receive execution results from the source node. The execution results can indicate whether the source node executed the security binary code and the temporary token, where the control flow information is sent to the source node in response to determining that the source node executed the security binary code and the temporary token within a predetermined time period.

In some embodiments, the method 1200 may include responsive to determining that the source node failed to transmit the runtime execution result within the predetermined time period, preventing transmission of the control flow information to the source node.

The method 1200 may include receiving a node flow creation request from the source node via the first control flow (block 1204). The node flow creation request may be of a request to forward data associated with a first application associated with the source node to the destination node. The node flow creation request may identify the destination node and the first application.

In some embodiments, the method 1200 may include receiving a certificate request from the source node, the certificate request including information to authenticate at least one of a user associated with the source node and the first application executing on the source node. The method 1200 may include validating the certificate request, and responsive to validating the certificate request, transmitting a security code to the source node, the security code indicative of the validity of a security application executing on the source node. The method 1200 may include receiving a security code execution result indicative of whether the control application executed the security code, wherein the first control flow is maintained based on determining that the control application executed the security code.

In some embodiments, validating comprises forwarding the certificate request to an authentication server, receiving a certificate request authentication result from the authentication server indicative of whether the certificate request is authenticated, and responsive to determining that the certificate request authentication result indicates that the certificate request is authenticated, updating at least one of a listing of user identifiers and the application whitelist and forwarding the certificate request authentication result to the source node.

The method 1200 may include determining that the first application is listed in an application whitelist (block 1206). The application whitelist may include a listing of applications that are allowed to transfer data to the destination node in a private network. A second control flow may be established between the controller and the destination node based on determining that the application identifier identifying the first application is included in the application whitelist.

In some embodiments, the method 1200 may include forwarding the node flow creation request to an authentication server, and receiving authentication information from the authentication server, the authentication information identifying nodes that the source node is allowed to transfer data to and applications associated with the source node that are included on the application whitelist, wherein said determining whether the application identifier identifying the first application is included in the application whitelist is based on inspecting the authentication information from the authentication server and determining that the first application is included in the applications associated with the source node that are included on the application whitelist.

In some embodiments, the method 1200 may include responsive to determining that first application is included in the application whitelist that includes applications that are allowed to transfer data to nodes in the private network, establishing a second control flow between the destination node and the controller. A second node flow security message may be transmitted to the destination node, the second node flow security message including at least one of a node flow identifier, a gateway internet protocol (IP) address, a port number of the gateway, and an encryption key. The second node flow security message may be transmitted to the gateway to establish the second node flow between the destination node and the gateway, wherein a data packet from a first application executing on the source node is configured to be forwarded along the first node flow to the gateway, and the gateway is configured to forward the data packet to the destination node along the second node flow.

In some embodiments, the method 1200 may include, responsive to determining that the application identifier identifying the first application does not match any identifier listed in the application whitelist, removing the control flow between the source node and the controller.

The method 1200 may include the controller sending the node flow creation request to a gateway connect to the source node and destination node (block 1208)—in drawing—update "sending" to "send". Responsive to determining that the application identifier identifying the first application is included in the application whitelist, the method 1200 may include establishing a first node flow between the source node and a gateway and a second node flow between the destination node and the gateway (block 1210).

In some embodiments, the first node flow includes a virtual routing mapping that includes information to virtually route data packets from the source node to the destination node via the gateway.

The method 1200 may include forwarding a data packet from the source node to the destination node via the first node flow and the second node flow (block 1212).

In some embodiments, the gateway may be configured to receive a data packet from the first application of the source node via the first node flow, the first node flow including an internet protocol security (IPSec) encrypted tunnel, the first data packet identifying the destination node. The gateway may also be configured to match the identified destination node included in the first data packet with the destination node identified in the node flow creation request. The gateway may also be configured to, responsive to matching the identified destination node included in the first data packet with the destination node identified in the node flow creation request, forwarding the first data packet to the destination node via the second node flow.

In some embodiments, a trusted source node may receive a security code from a controller each time a connection request is identified. The security code may be executed and updated one or more times. An encrypted control flow may be established between the trusted source node and the controller. The control flow may enable secure transmission of data between the source node and controller across a network. The secure transmission of data over the control flow may ensure that a security application executing on one of the trusted source node and the controller may identify tempering/malicious data and prevent the transmission of malicious or unauthorized data.

In some embodiments, the trusted source node may receive a security code at a first time, during a specific time interval, or upon the triggering of an event based on a policy stored at the controller. Upon receipt of the security code, either a previously-received code is discarded, or a new code is executed with the previously-received code. The security code may be stored at different portions of the trusted source node to increase security of the code. The security code may prevent manipulation of the target and control applications executing on the trusted source node.

In some embodiments, the controller may classify available applications on each trusted node that are allowed access to transmit data in an application whitelist. The controller may use a control flow to identify the privileged applications. A security application executing on the trusted node may detect whether a particular application needs to be controlled or not. The security application may monitor the applications and send periodic reports to the controller via the control flow. Using these reports, the controller may determine if tempering of an application has occurred. If tempering has occurred, the controller may request a tear down of all network connections associated with the control flow.

In some embodiments, the security application may communicate with the controller when a control application requests to connect to a trusted destination node. By using authentication, the controller may verify that the requesting application can access the trusted destination node. It may provide to the security application appropriate node flow information to connect to the destination node. The security application may create a node flow between the trusted destination node and a target gateway or use an existing node flow. For each direction of traffic, there may include a separate node flow. A similar node flow can exist between the target gateway and the trusted destination node.

In some embodiments, the security application may send the data provided by the control application to the destination node using the encrypted node flow. Any other data sent by the control application may be blocked. The security application may monitor the data transmitted by applications, so that if a rogue or malicious application tries to send a packet to the destination node, it will be blocked by the security application.

In some embodiments, the target gateway, upon receipt of a packet from the trusted node, may check the validity of packet. If the packet has correct information (e.g. node flow ID) it may forward the packet to the destination node, otherwise the packet may be dropped.

Application White Flow Overview

In many cases, devices connected in a network utilize various security techniques (e.g., anti-virus/malware applications) to inspect network traffic and determine whether a device in the network is infected with malware. As noted above, devices that are compromised (e.g., infected with malware) may leave other devices connected to the compromised device vulnerable to attack.

Further, if malicious code is not known to a security application executing on a device, the security of that device may not be guaranteed. In such cases, the device may have a zero-trust status. Further, networks that include device(s) with a zero-trust status and transmit/receive data may be regarded as in a zero-trust state.

Many network access control ("NAC") technologies are designed to connect only with authorized or authenticated devices. Devices in such networks may authorize devices using IP addresses and tunnels (e.g., VPN tunnels). However, with such tunnel technologies (such as Internet Protocol Security (IPSec)), a tunnel created between a source node and a destination node may be unable to detect whether the data transmitted through these tunnels via the gateways on the network path is valid. As a result, malicious code can transmit and receive data through the same tunnel in which other applications are transmitting data. In addition, many IP-based network access control mechanisms have difficulty providing secure access since a hijacked/stolen terminal can also access the same network.

The present embodiments relate to establishing an application white flow-based network tunnel control to facilitate secure data transmission between nodes in a network. An application white flow tunnel can include an application flow that securely forwards data packets along a node flow between any of a source node, a destination node, and one or more gateways connecting nodes in the network.

The present embodiments may be applied to zero-trust network environments because the source node can be connected to the network and the destination can reject a connection request from a source node to allow only secure connections to the source node. The destination node may accept connection requests and establish connections to devices via authorized tunnels (e.g., via a secure application flow established between the source node and destination node).

Additionally, separate tunnels may be created for each application to differentiate the paths between two nodes. Establishing separate tunnels (i.e., application flows) can ensure that unauthorized applications are unable to connect to or communicate with nodes in a network. In other words, a multi-tunnel structure can facilitate secure transmission of data only by authorized (or secure) applications in the tunnel between authorized nodes. This allows for protection from malicious code transmitting data through tunnel on a zero-trust device, which also can prevent various threats in a zero-trust network.

Figure 13:
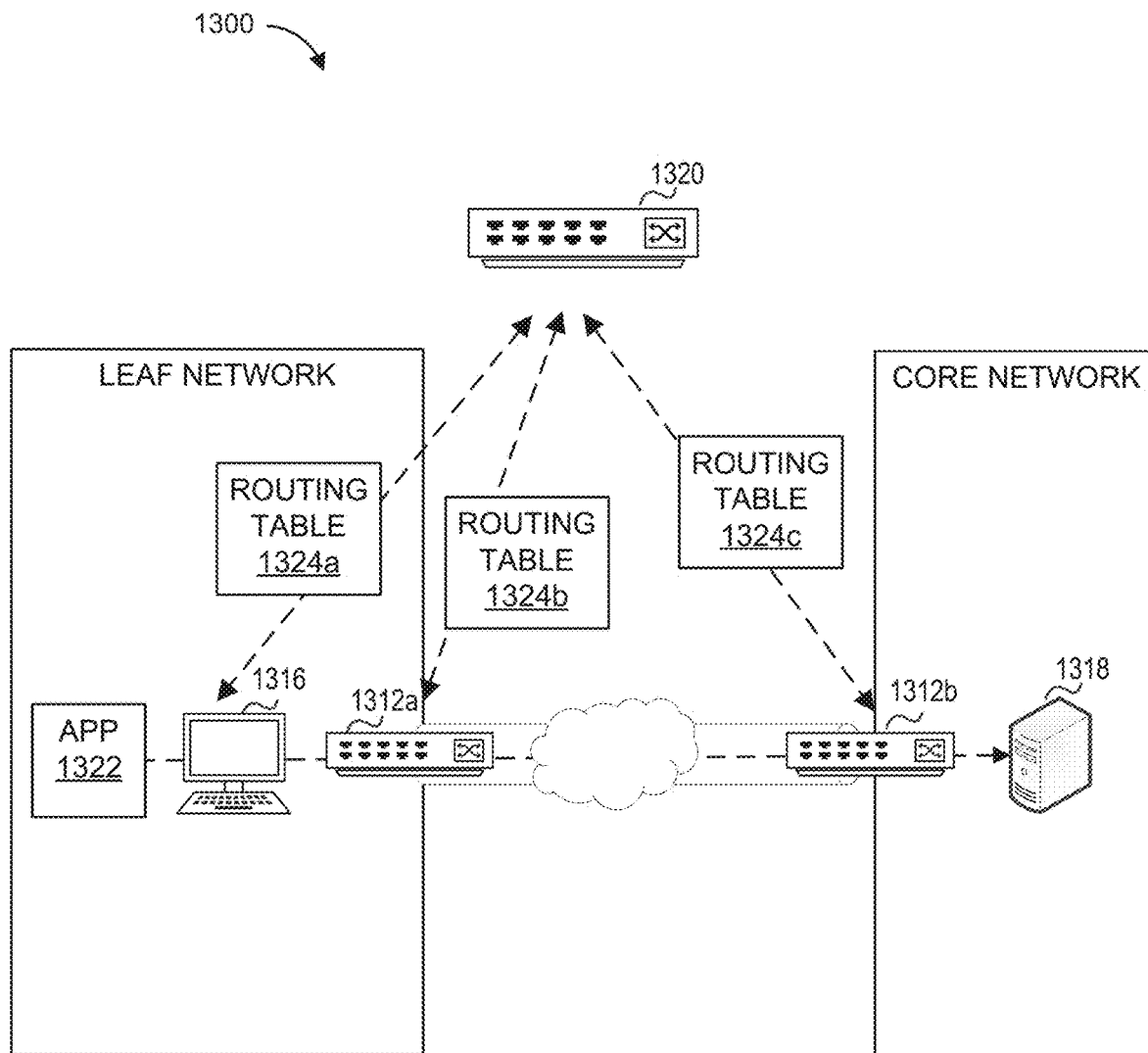
FIG. 13 illustrates a block diagram of a leaf network and a core network, in accordance with various embodiments.

FIG. 13 illustrates a block diagram 1300 of a leaf network and a core network, in accordance with various embodiments. As shown in FIG. 13, nodes 1316, 1318 may communicate between a leaf network 1310 and a core network 1314. A network may include one or more gateways 1312a-b. For example, leaf network 1310 may include a perimeter gateway 1312a. Core network 1314 may include a perimeter gateway 1312b. A gateway 1312a-b may include a device that can manage and control node flow between nodes in a network.

A source gateway (e.g., perimeter gateway 1312a) can include a gateway for relaying node flow and/or application flow information to a source node (e.g., laptop 1316). In some embodiments, a device (e.g., laptop 1316) may include one or more applications 1322. In some embodiments, there can be at least one gateway to relay data between source node (e.g., laptop 1316) and a destination node (e.g., server 1318). In some embodiments, a relay gateway may be included that may manage and control a node flow on the path through which data is transmitted and/or relay data over the node flow. A destination gateway (e.g., perimeter gateway 1312b) can include a gateway for transmitting data to the destination node (e.g., server 1318). Data may be transmitted between the source node 1316 and the destination node 1318 using a routing table 1324a-c.

A controller (e.g., perimeter controller 1320) may manage and control nodes and gateways. The controller 1320 may have the overall view of the network and the control over different nodes and applications that are allowed on the network.

Figure 14:
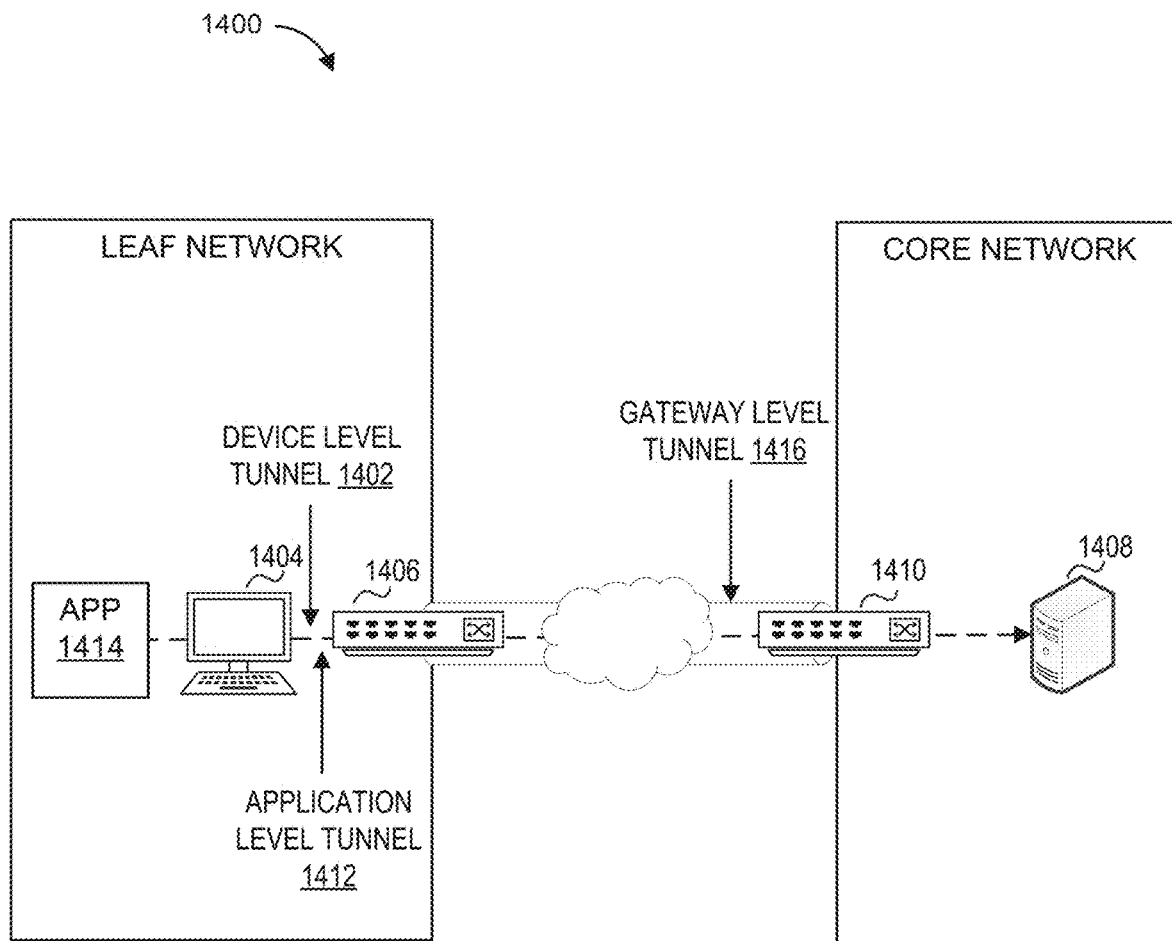
FIG. 14 is a block diagram illustrating various tunnel types, in accordance with various embodiments.

A network may include various tunnel types. FIG. 14 is a block diagram 1400 illustrating various tunnel types, in accordance with various embodiments. As shown in FIG. 14, a tunnel type may include a device level tunnel 1402. A device level tunnel 1402 may include a tunnel between source node 1404 and the first perimeter gateway 1406. The device level tunnel 1402 can also be created between the destination node 1408 and the destination gateway 1410.

A tunnel type may include an application level tunnel 1412. The application level tunnel 1412 may include a tunnel between source node application 1414 and the destination perimeter gateway 1410. The application level tunnel 1412 may be created between the destination node 1408 and the destination gateway 1410.

A tunnel type may include a gateway level tunnel 1416. The gateway level tunnel 1416 may be a tunnel between two perimeter gateways (e.g., gateways 1406, 1410).

Figure 15:
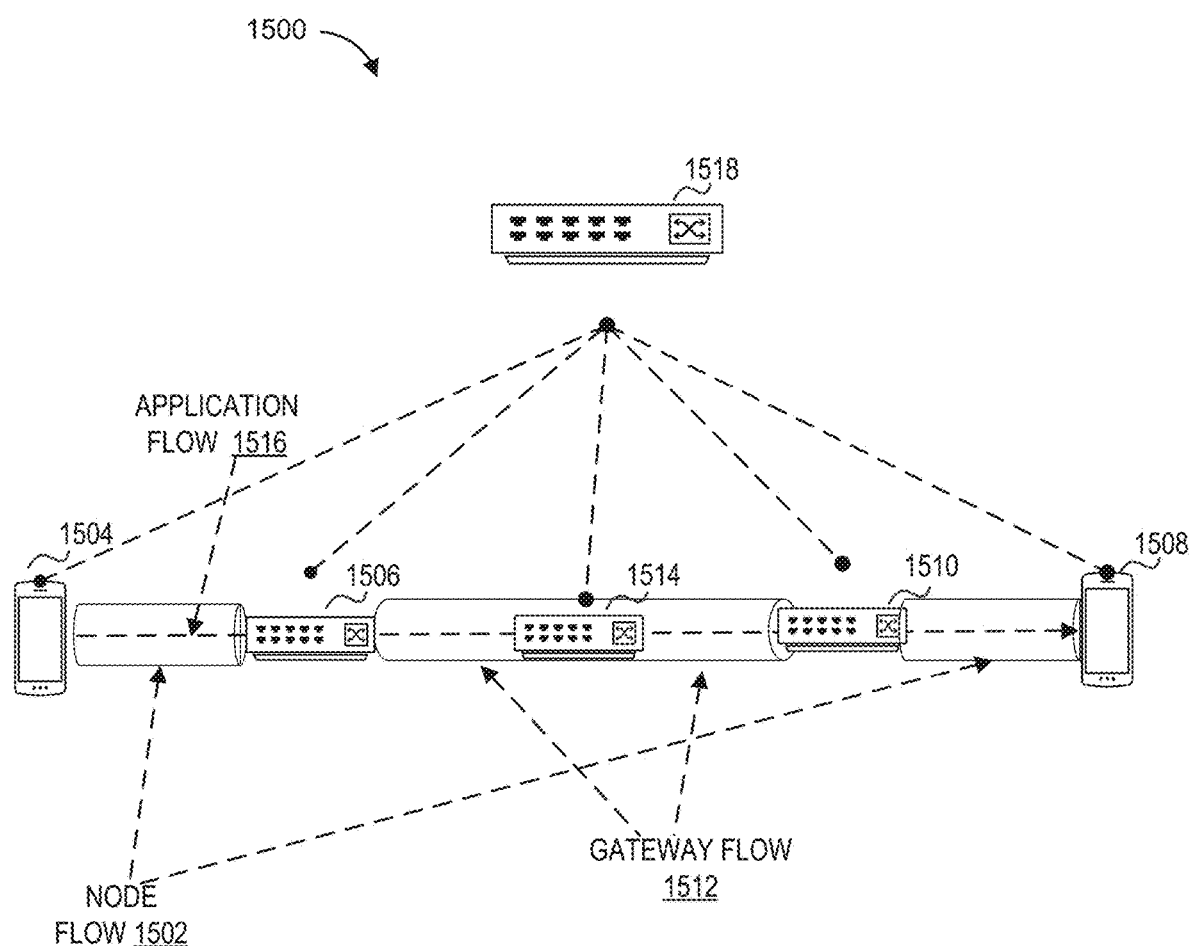
FIG. 15 illustrates a block diagram of a flow between devices, in accordance with various embodiments.

FIG. 15 illustrates a block diagram 1500 of a flow between devices, in accordance with various embodiments. A flow may be indicative of a tunnel for managing and controlling the flow of data packets between two devices. Tunnels can be of different types as defined in the controller settings (IPSec, SSL, etc.).

A node flow 1502 may be created between a node (e.g., source node 1504) and a source gateway 1506. A node flow may be created upon a request by the source node 1504, where the tunnel end points may include the source node 1504 and the source gateway 1506. Similarly, a node flow 1502 may be established between a destination node 1508 and a destination gateway 1510.

A gateway flow 1512 may be created between two gateways (e.g., source gateway 1506 and relay gateway 1514, destination gateway 1510 and relay gateway 1514). A gateway flow 1512 may calculate the routing paths through gateways based on gateways registered in the controller. The flow necessary for such data transmission may be generated in advance or on demand. Various techniques (e.g., IPSec) can be used to manage various tunnels. To better control the data transmitted between the applications, the system uses application flows.

An application flow 1516 may include a tunnel to securely transmit data between two authorized applications (a tunnel end point for applications) over the node flow. The application flow may be a data channel between a source node application and a destination node/destination gateway.

Figure 16:
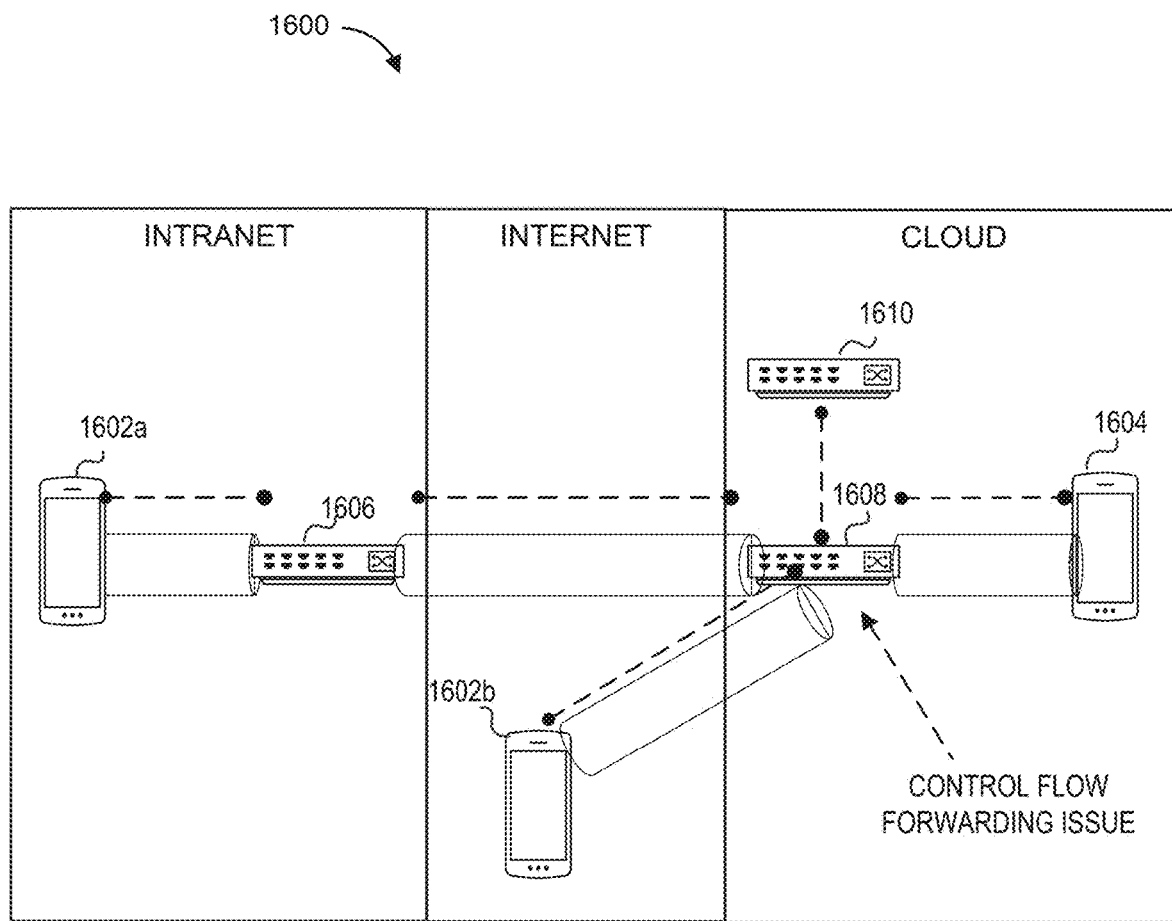
FIG. 16 illustrates a block diagram of a control flow between nodes, in accordance with various embodiments.

FIG. 16 illustrates a block diagram 1600 of a control flow between nodes, in accordance with various embodiments. A control flow may be a tunnel for managing and controlling nodes and gateways. A control flow may be set up between a node (e.g., source node 1602*a-b*, destination node 1604) or a gateway (e.g., source gateway 1606, destination gateway 1608) and a controller 1610.

The control flow may provide security modules to connected nodes that can periodically be executed on the connected nodes to support a terminal validation for detecting harmful environment and assisting in identifying threats. The control flow can support application validation for the security application, a controlled application, and other applications running on the terminal. The control flow may support memory stack/modulation detection and can ensure that the terminal is operating normally and continuously.

Additionally, the control flow can provide secure transmission of the terminal security information. Authentication requests (e.g., sending a user ID and passwords to an authentication server and receiving the results) may provide secure transmission of security information. Two-way security information relating to the destination node (e.g. SMS received value) may be forwarded along a control flow.

A perimeter controller may use the control flow to determine whether a terminal is threatened and to detect and protect against threats. The controller may disable the connections based on the control flow termination policy defined in the controller and can block the network if a threat is detected. For example, the controller can disable node flow and application flows related to the control flow and can cancel all flows on the terminal associated with the control flow. The control flow may pass information to perimeter gateways and nodes on the tunnel path.

A type of node flow may include a flow start point and end point. A node flow may be created at the node (starting point) and the gateway (end point). However, if the node is not controlled by the controller (e.g., IP Telephony), the node flow creation between the node and the gateway may be skipped.

An application flow may have a start point and end point. An application flow can include various connections. An application flow may include a controlled node to controlled node connection. When the source node and the destination node are controlled by the controller, the start point of the application flow may be a source node and the end point may be a destination node.

An application flow may include a controlled node to uncontrolled node connection. If the source node is controlled by the controller but the destination node is not controlled, then the starting point of the application flow may be source node and the end point may be the gateway closest to the destination node.

An application flow may include an uncontrolled node to controlled node connection. If the source node is not controlled by the controller but the destination node is under control, then the starting point of the application flow may be the first gateway connected to the source node and the other end point may be the destination node.

An application flow may include an uncontrolled node to uncontrolled node connection. If the source node and the destination node are not controlled by the controller, then the starting point of the application flow may be the first gateway connected to the source node and the other endpoint may be the gateway closest to the destination node.

A node flow may have a tunnel starting point and a tunnel end point. A tunnel starting point may include a source node (source node controlled by controller). A tunnel starting point may include a destination node (destination node controlled by controller). For nodes not controlled by the controller, the node flow tunnel can be eliminated (e.g. IP telephony or IoT devices).

A tunnel end point may include a source gateway for source node connected to it. A tunnel end point may include a destination gateway for destination node connected to it. When an application flow is between controlled nodes, a tunnel starting point may be the source node and the tunnel end point may be the destination node.

When an application flow is between a controlled node to an uncontrolled node, a tunnel starting point may be the source node and the tunnel end point may be the destination gateway (connected to destination node).

When an application flow is between uncontrolled nodes, a tunnel starting point may be the source gateway connected to source node and the tunnel end point may be the destination node. In some embodiments, the application flow between uncontrolled nodes may have a tunnel start point of a source gateway and a tunnel end point of a destination gateway. A control flow may have a tunnel starting point of a source node or destination node or gateway and a tunnel end point of the controller.

Figure 17:
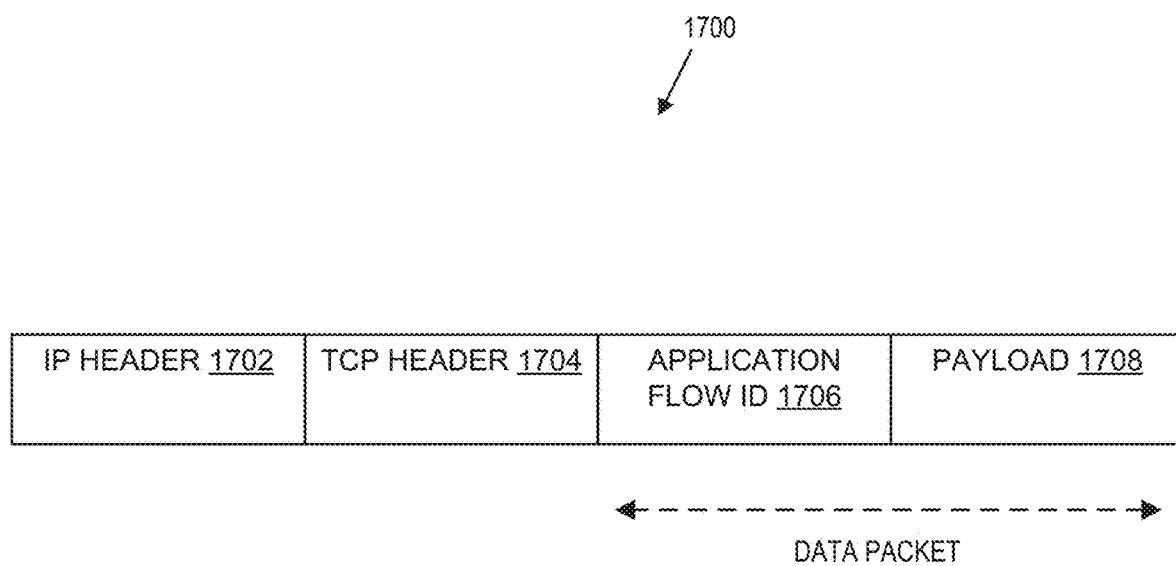
FIG. 17 is a block diagram of a packet structure, in accordance with various embodiments.

FIG. 17 is a block diagram 1700 of a packet structure, in accordance with various embodiments. In many cases, tunneling may include concatenating headers to another header (e.g., IP, TCP headers) of a packet. In such cases, if the header is lost or corrupted during the transmission over various network paths (not compatible with the network), data may be lost or not transmitted.

In the present embodiments, tunnel information may identify an application flow between gateways and nodes. Particularly, the application flow ID 1706 may be after an IP header 1702 and a TCP header 1704 portion of a packet.

In some embodiments, the data in the packet may be encrypted after the application flow ID, which may facilitate secure data transmission. Data packets can pass through and control various kinds of tunnels in a path (application flows ID are not part of the encryption). An application flow ID (e.g., an identifier including 8 bytes of data) may be used to identify the application flow created between the source node and the destination node.

An application flow routing table may be created by a controller and provide information about the nodes and gateways in the path. Each node and gateway may receive application flow routing table information that includes information about what to do with the flow, such as to encrypt, decrypt, or forward the data packet according to the information contained in the application flow routing table.

A routing type may identify a data packet routing path. Examples of data packet routing may include gateway to gateway (internal) routing, gateway to gateway (external) routing, node to gateway routing, and gateway to node routing.

Node packet processing information may identify elements to process for a source node and a destination node. Examples of elements to process for a source node and a destination node may include whether data packet encryption/decryption is required, a data packet encryption/decryption algorithm, and a data packet encryption/decryption key.

Gateway packet processing information may provide elements to be processed by a gateway. Example elements to be processed by a gateway may include a route for the data packet (node flow or gateway flow ID, port, virtual NIC information, etc.), whether data packet encryption/decryption is required, data packet encryption/decryption algorithm, and a data packet encryption/decryption key.

Flow Chain Hierarchy

Figure 18:
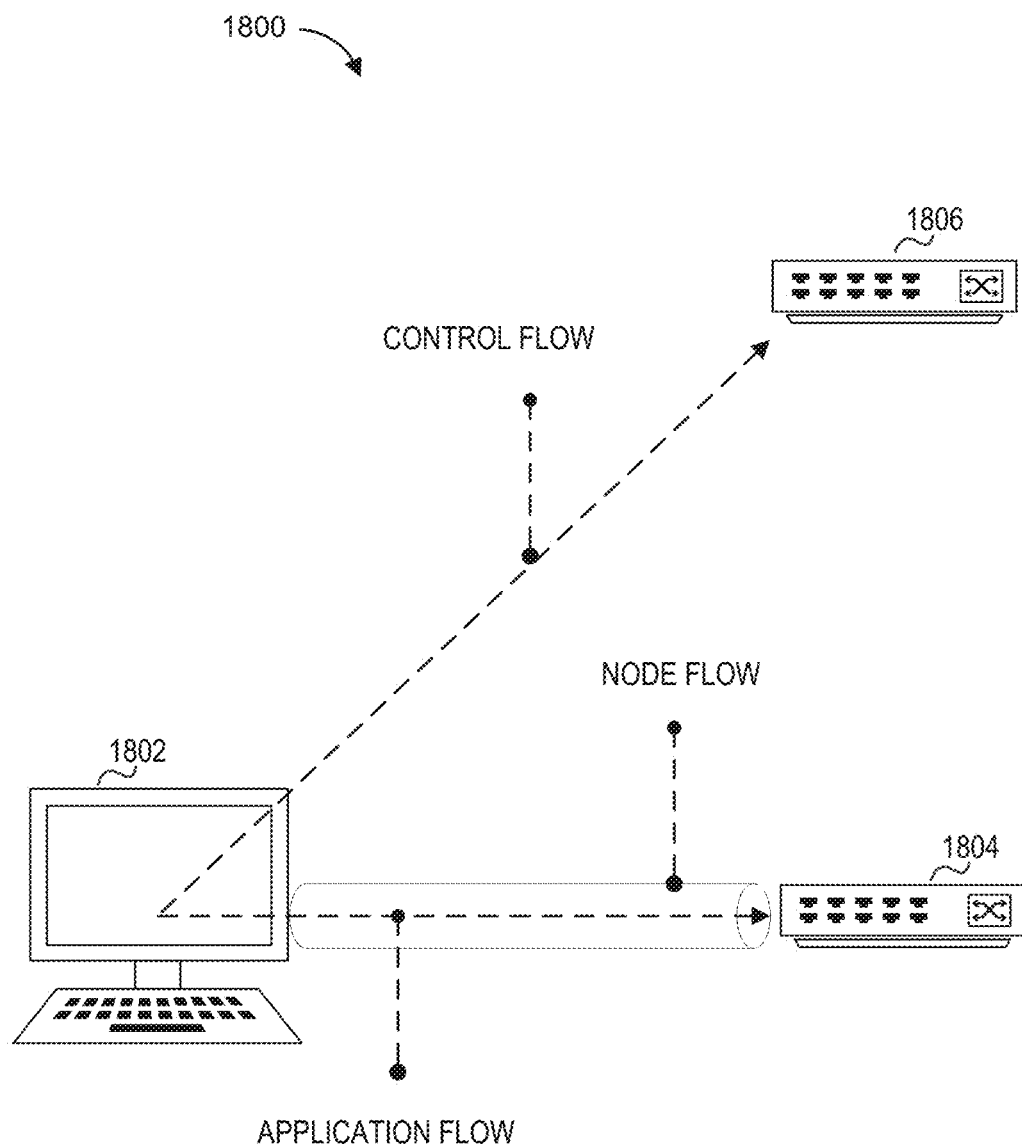
FIG. 18 illustrates a block diagram illustrating a flow chain hierarchy, in accordance with various embodiments.

FIG. 18 illustrates a block diagram 1800 illustrating a flow chain hierarchy, in accordance with various embodiments. Any of a control flow, a node flow and an application flow may form a flow chain hierarchy. Configuration and management of the flow chain may be performed within the flow chain hierarchy. If a threat is detected on a node (e.g., device 1802), the node flow, the application flow, and the associated control flow associated may be deleted.

As shown in FIG. 18, an application flow may be established between a device 1802 and a perimeter gateway 1804. A control flow may be established between the device 1802 and a perimeter gateway 1806.

Figure 19:
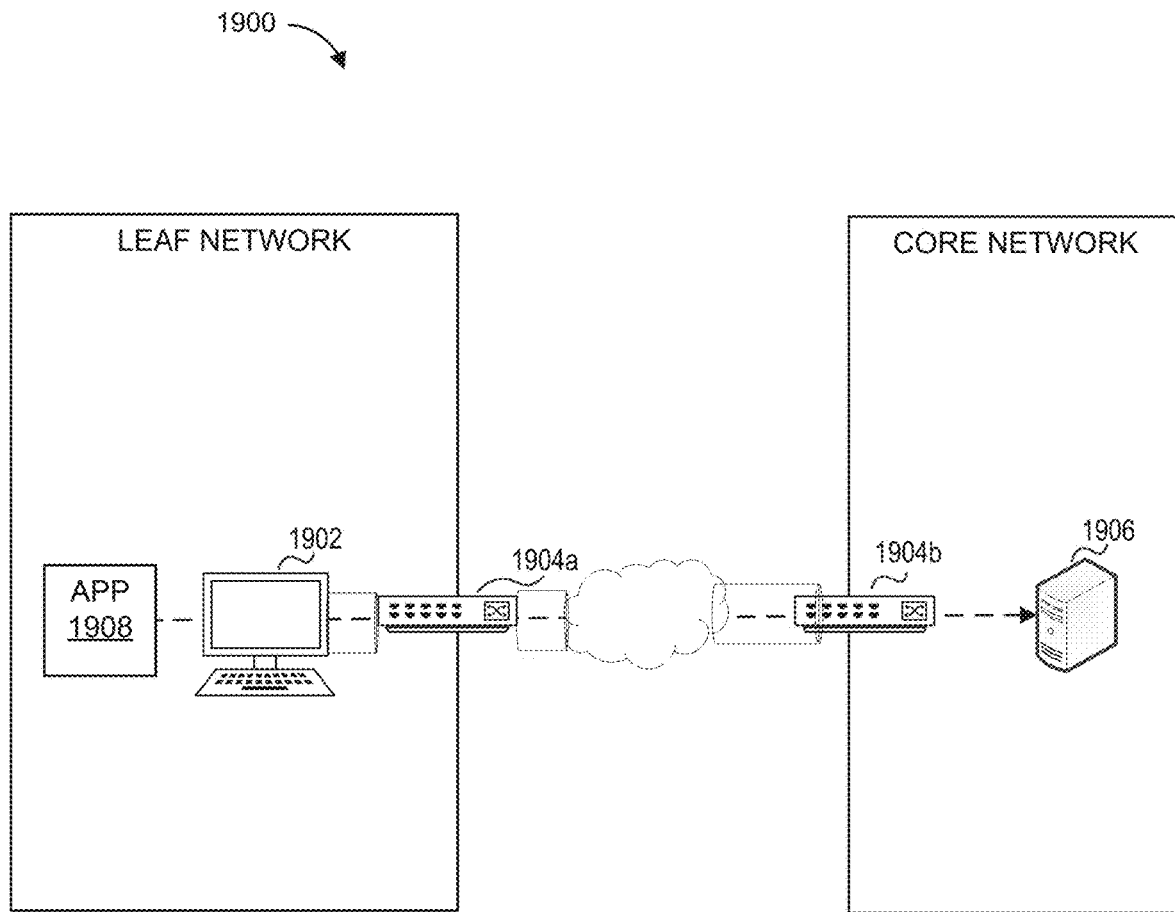
FIG. 19 illustrates a block diagram of a flow chain hierarchy from an internal network to an internal network, in accordance with various embodiments.

FIG. 19 illustrates a block diagram 1900 of a flow chain hierarchy from an internal network to an internal network, in accordance with various embodiments. In the above scenario, the source node 1902 can create a control flow with a controller. A tunnel starting point may be the source node 1902 and the tunnel end point may be the perimeter gateway (e.g., perimeter gateway 1904a, 1904b). Optimized boundary techniques that are hierarchically structured can be applied to enable secure edge cloud-based networks using tunnel technology.

Figure 20:
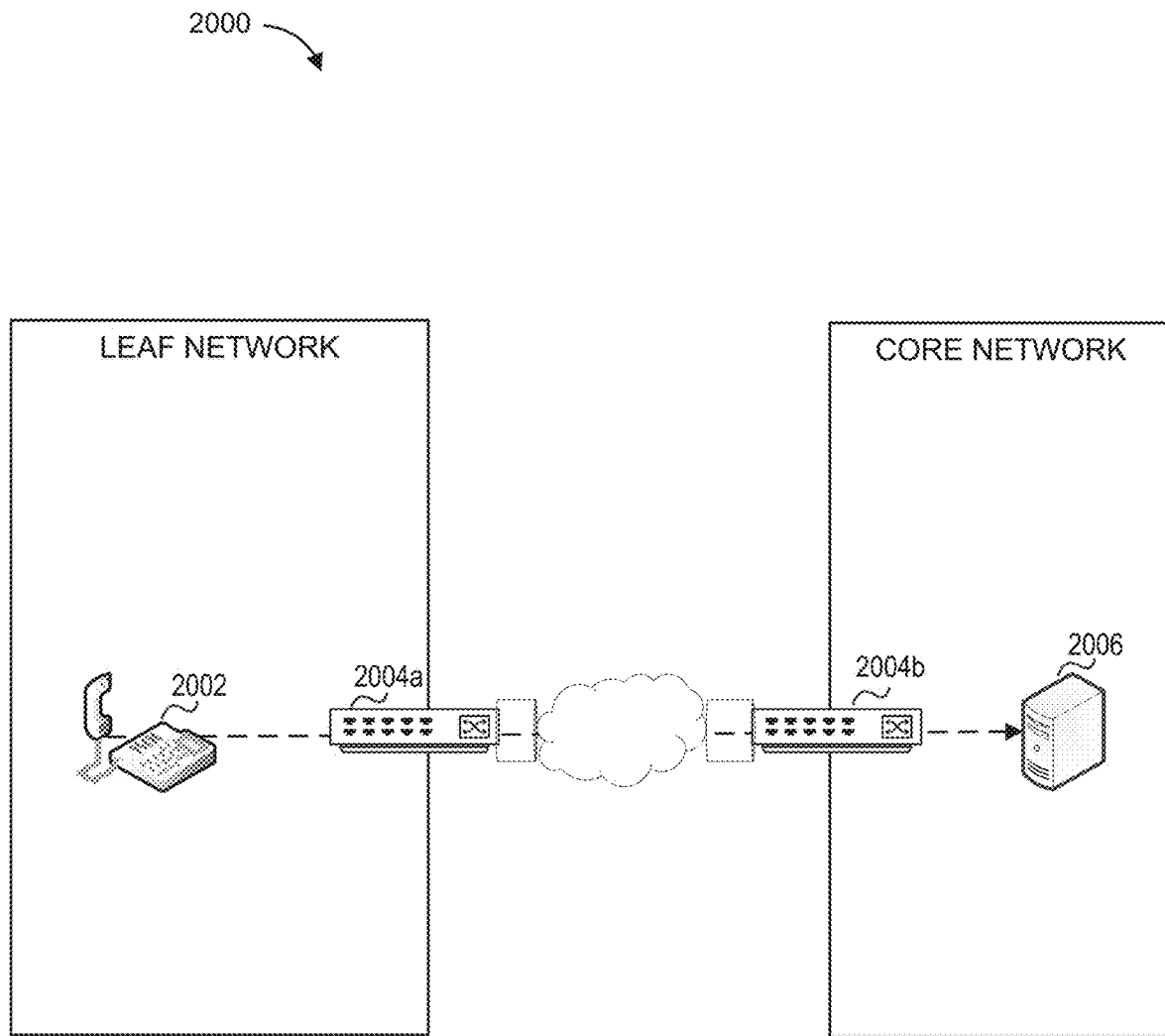
FIG. 20 illustrates a block diagram of a flow chain hierarchy between internal networks, in accordance with various embodiments.

FIG. 20 illustrates a block diagram 2000 of a flow chain hierarchy between internal networks, in accordance with various embodiments. In this scenario, the source node (e.g., IP Telephony terminal 2002) may be unable to create a control flow with a controller, so the connected perimeter gateway 2004a, 2004b can perform the function. The tunnel starting point may include the perimeter gateway 2004a, 2004b to which the source node 2002 is connected. The tunnel end point may include a server 2006 or another device (e.g., a VoIP device).

Figure 21:
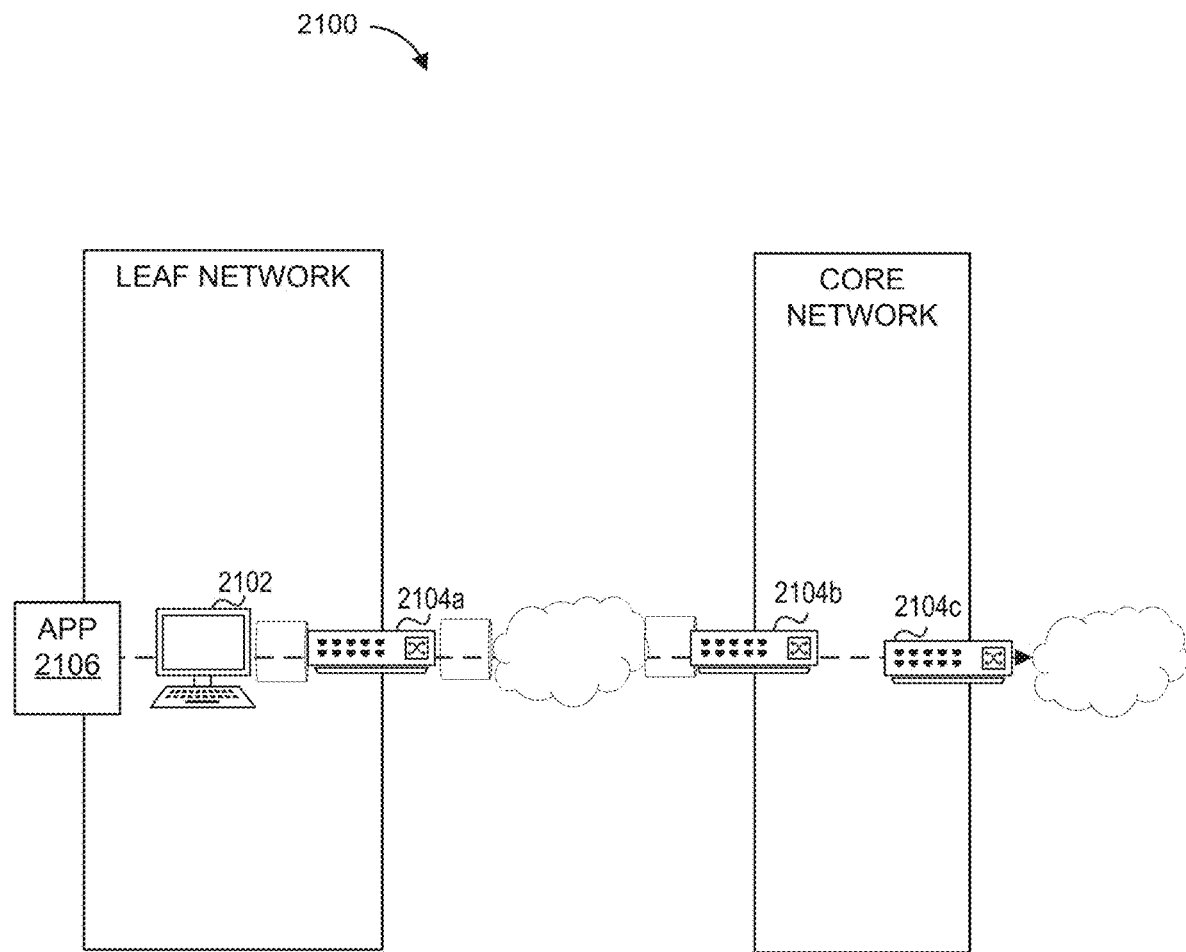
FIG. 21 illustrates a block diagram of a flow chain hierarchy between an internal network and an external network, in accordance with various embodiments.

FIG. 21 illustrates a block diagram 2100 of a flow chain hierarchy between an internal network and an external network, in accordance with various embodiments. In this scenario, a destination node may be an external network boundary. The source node 2102 can create a control flow with a controller. The tunnel starting point may be the source node 2102. A tunnel end point may include a perimeter gateway 2104a-c.

Figure 22:
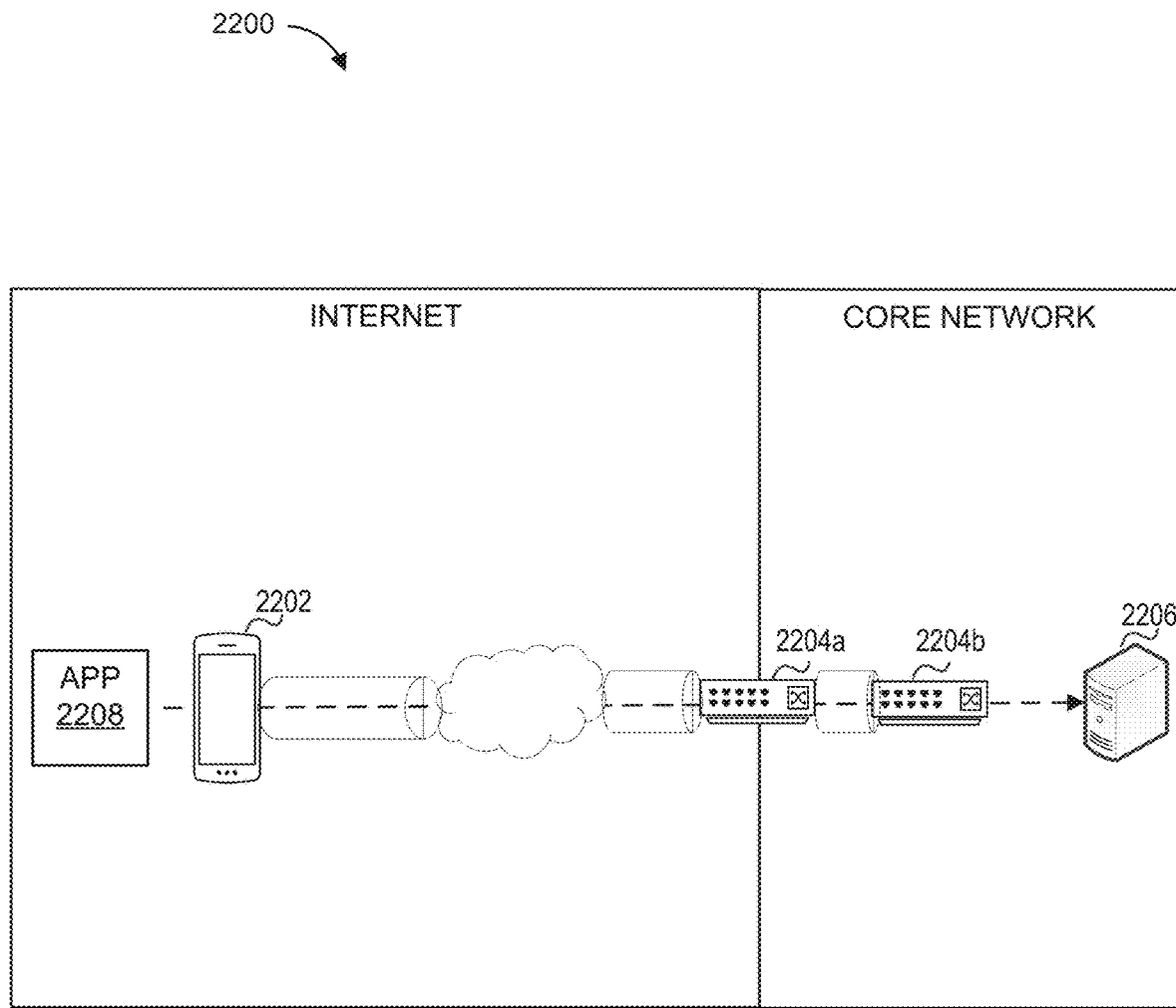
FIG. 22 illustrates a block diagram of a flow chain hierarchy between an external network and an internal network, in accordance with various embodiments.

FIG. 22 illustrates a block diagram 2200 of a flow chain hierarchy between an external network and an internal network, in accordance with various embodiments. In this scenario, a mobile node 2202 can be on the external network, and the source node can create a control flow with a controller. A tunnel starting point may be the source node. The tunnel end point may be a perimeter gateway 2204a connected to the source node.

Figure 23:
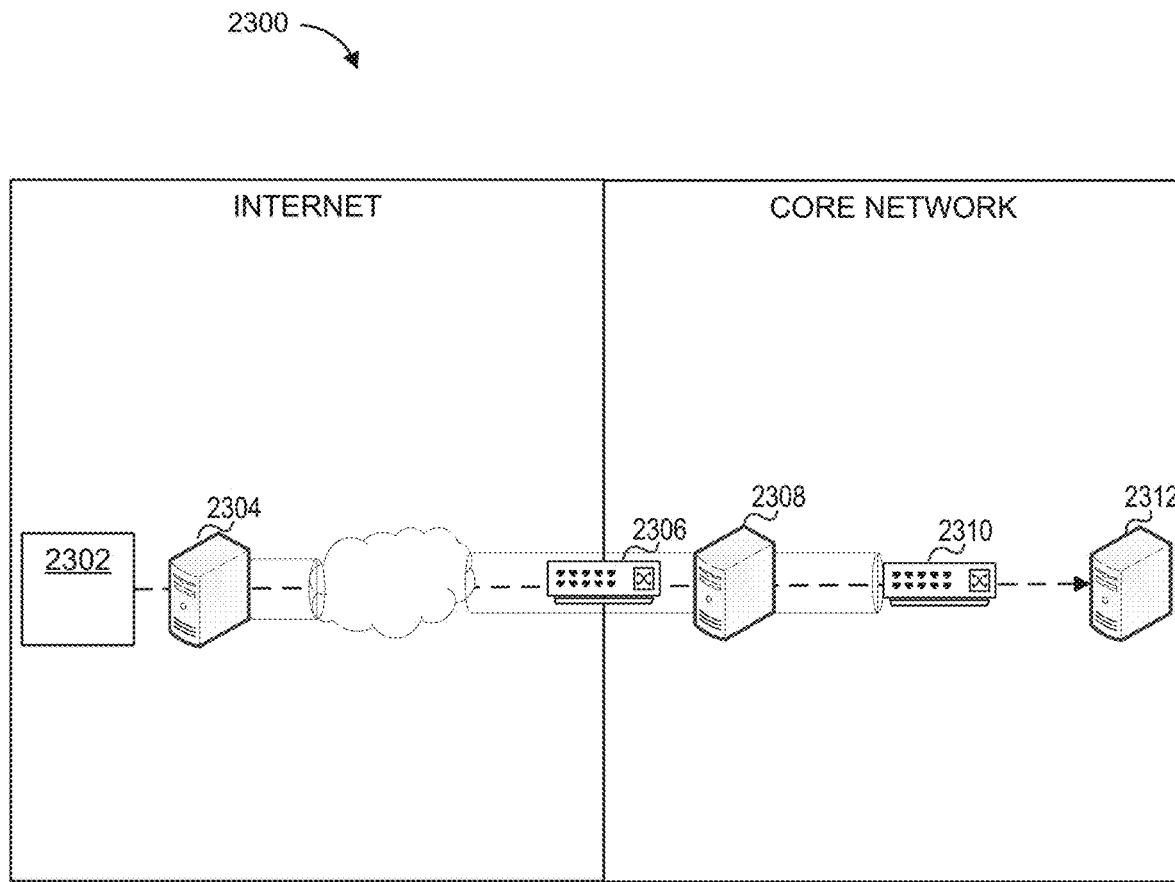
FIG. 23 illustrates a block diagram of a flow chain hierarchy between an external network and an internal network, in accordance with various embodiments.

FIG. 23 illustrates a block diagram 2300 of a flow chain hierarchy between an external network and an internal network, in accordance with various embodiments. In this scenario, trusted data may be transmitted from a device 2302 on an external network to a system server 2308 on the internal network via a perimeter gateway 2306. Two physically separated networks may be configured and applied to network links by blockchain servers 2304, 2308.

An external network data exchange may include a tunnel starting at an IoT blockchain server 2304. A tunnel end point may be a blockchain server 2308. An internal network data exchange may include a tunnel starting point as the blockchain server and a tunnel end point as the perimeter gateway.

The system may include an application of various types. An application can include a device side executable application that can, for example, include a web browser that runs on each device and can use http/https ports.

An application can include a service application that may be a web application or application that uses a specific service port. The service application may interact with a tunnel between an approved application on source node and the target application on the destination node to provide network access control via the service application.

The application may provide a way to securely send and receive data between devices and networks in a zero-trust environment. Data packets without tunnel information may be discarded as they pass through the gateway, and networks can be configured for any environment.

Tunneled packets can pass through existing network environment using a defined tunnel structure. The application flow ID in the packet may not be encrypted, but the rest of the data payload may be encrypted. The application flow ID in the packet may include relevant routing information that helps the gateway by using the IP NAT policy on each path in the network.

Using ID-based data packet routing, mobility of the device can be improved by building a logical view of the network. The IP address of the mobile device may change when moved from one network to another. Because the application flow ID may be used for routing here, IP changes do not affect system operation.

An application flow routing table may enable a device to process security algorithms on a segment-by-segment basis, based on the capabilities of the devices and the gateways in the network environment. This may provide flexibility, so encryption/decryption can be applied in the network. Various types of flow control may be possible by using the ID and the application flow routing table (e.g., load balancing, fail over, QoS). Immediate network blocking (isolation) may be possible if a threat is detected.

Node Flow and Application Flow Creation Process

Figure 24:
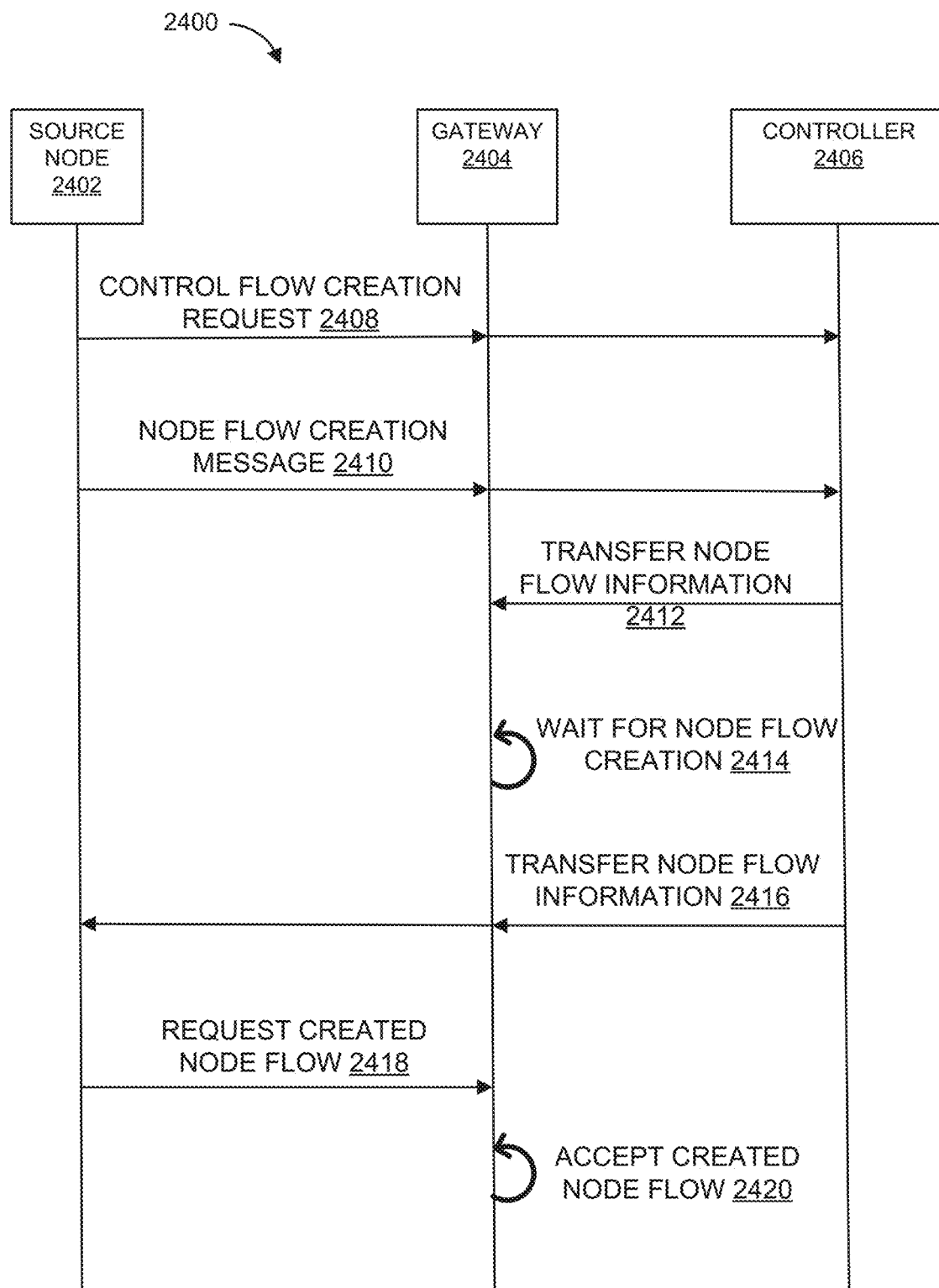
FIG. 24 illustrates a signaling process to create a node flow, in accordance with various embodiments.

FIG. 24 illustrates a signaling process 2400 to create a node flow, in accordance with various embodiments. In accordance with this node flow generation process, the source node may create a node flow using the gateway closest to the path. This may create an environment where various network access controls can be applied to achieve the confidentiality and integrity of data transmission when data is transmitted or received at the gateway.

The source node 2402 may send a control flow creation request 2408 to a gateway 2404. The gateway 2404 may send the request to a controller 2406 requesting creation of a control flow between itself and the controller. The controller may accept the request and return a result.

The gateway 2404 may examine the structure of the data packets requested by the node and if the destination IP address corresponds to the controller IP on the NAT policy. The gateway 2404 may forward the data packet to the controller 2406 using the control between itself and the controller. If this is not the case, the controller can drop all data packets.

The source node 2402 may send a request to create a node flow 2410 to the gateway 2404. When an application on the source node 2402 wants to transmit data, the source node may check the destination IP address and the application ID of the data to be transferred. The source node 2402 may request the controller to create a node flow between itself and the gateway 2404 (assuming no node flow exists). The destination node IP address or the destination network IP address can also be requested.

If the destination IP is not specified, the controller may process the request and generate a list of gateways that the node can connect to for the creation of a node flow between itself and the gateway. If a destination IP is specified and the gateway the node is trying to connect is different from the gateway that relayed the request, the controller may perform the process of selecting the node flow and the gateway of the network to which the node is trying to connect. The controller may prepare an initialization information (key) and generate a node flow according to conditions mentioned above.

The controller 2406 may send a node flow information transmission 2412 to the gateway 2404. The controller may be connected to the gateway from which the node flow is to be generated and may transmit initialization information for creating a tunnel when a node flow generation request is received from the node.

The gateway 2404 may wait for a node flow creation based on the received node flow generation information (2414).

The controller 2406 may send initialization information 2416 to the source node 2402 to generate a node flow that contains the gateway IP information.

The source node 2402 may send a request for the created node flow 2418 to the gateway 2404 based on the information received from the controller.

The gateway 2404 may accept the node flow created and validate the node flow information sent by the node and generates a node flow if the information is correct. The gateway may transmit the results to the controller.

Figure 25:
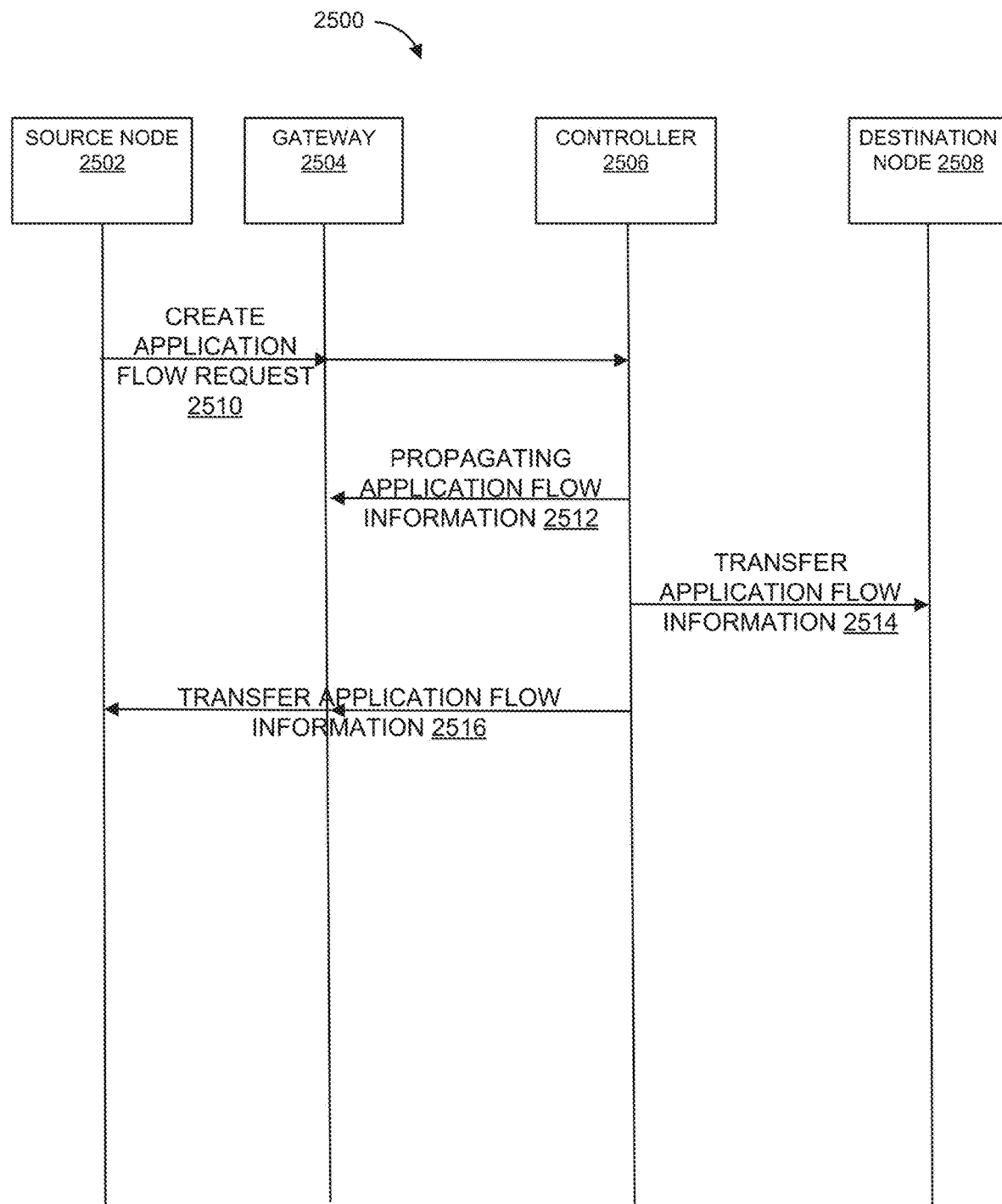
FIG. 25 illustrates a signaling process for creating an application flow, in accordance with various embodiments.

FIG. 25 illustrates a signaling process 2500 for creating an application flow, in accordance with various embodiments. Based on the application flow generation process, a source node can securely transmit and receive data from an application specific tunnel in which the destination node of the target network and the connected gateway exist.

The source node 2502 may send a create application flow request 2510 to a gateway 2504, and the gateway 2504 may forward the request 2510 to a controller 2506. The source node 2502 may check to see if there is an application flow ID for the destination IP that the application has sent to transfer the data. Without the application flow ID, any of the target IP and an application ID of the currently connected gateway may be sent to the controller via application flow generation request 2510.

The controller 2506 may propagate application flow information 2512 to the gateway 2504. The controller 2506 may verify that the destination IP and the application ID requested by the source node can be reached. The application flow routing table may be generated by the controller when the destination node is reachable.

An application flow routing table generated by the controller may be an efficient routing table based on various policies defined such as default routing policy, load balancing based on network traffic, level of encryption/decryption per section, etc. The generated application flow routing table may consist of a series of instructions to process on each terminal/gateway when a data packet is received. The controller may separate and transmit only a portion of the generated application flow routing table required by each terminal/gateway.

The gateway 2504 may store the application flow routing table information received from the controller. When a data packet arrives, the application flow ID may be extracted from the packet by the gateway 2504 and a look up is performed based on that ID. The gateway 2504 may execute the instructions defined for that application flow ID.

The gateway 2504 may perform some of the following instructions sent by controller for the application flow ID: encrypt the packet if the starting point of the tunnel, decrypt the packet if it the end point of the tunnel, and/or insert or delete application flow ID.

The controller 2506 may transmit application flow information 2514 to a destination node 2508. When the application flow routing table is generated, the controller may send it to the destination node if additional processing is required on the destination node. In some embodiments, the above step may only occur if the destination node has created a control flow with the controller. A destination node may decode a data packet, remove the application flow ID, and send it to the target application to process the data packet.

The controller 2506 may send application flow information 2516 to the gateway 2504, and the gateway 2504 may forward the information 2516 to the source node 2502. With the above process, the generation and propagation of the application flow routing table may be completed by the controller, it may send the information to the source node and indicate that it can start sending data packet to the first gateway using the application flow ID. The source node may start sending data packet to the gateway based on this information.

Figure 26:
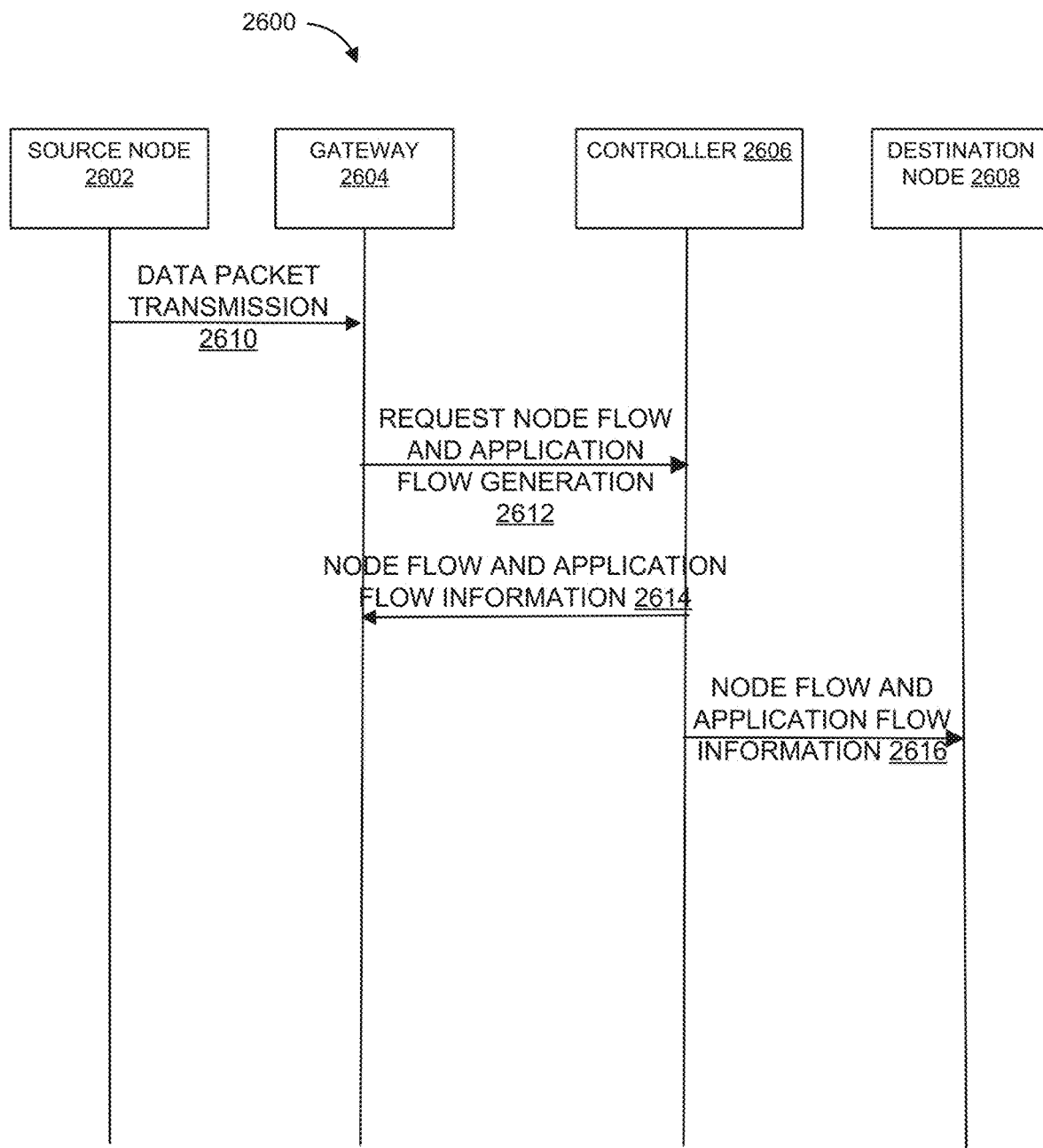
FIG. 26 illustrates a signaling process for an application flow creation process for a non-control flow, in accordance with various embodiments.

FIG. 26 illustrates a signaling process 2600 for an application flow creation process for a non-control flow, in accordance with various embodiments. The following process may be used when a terminal that is unable to create a control flow (e.g. IP telephony) uses the connected gateway to perform the application flow processing. It can then transmit and receive data securely from the destination node.

A source node 2602 may send a data packet transmission 2610 to a gateway 2604. The gateway 2604 may check the destination IP and port that the source node wants to connect to and sends a node flow and data lane generation request 2612 to a controller 2606.

The controller 2606 may propagate application flow information 2614, 2616 to the gateway 2604 and a destination node 2608.

Figure 27:
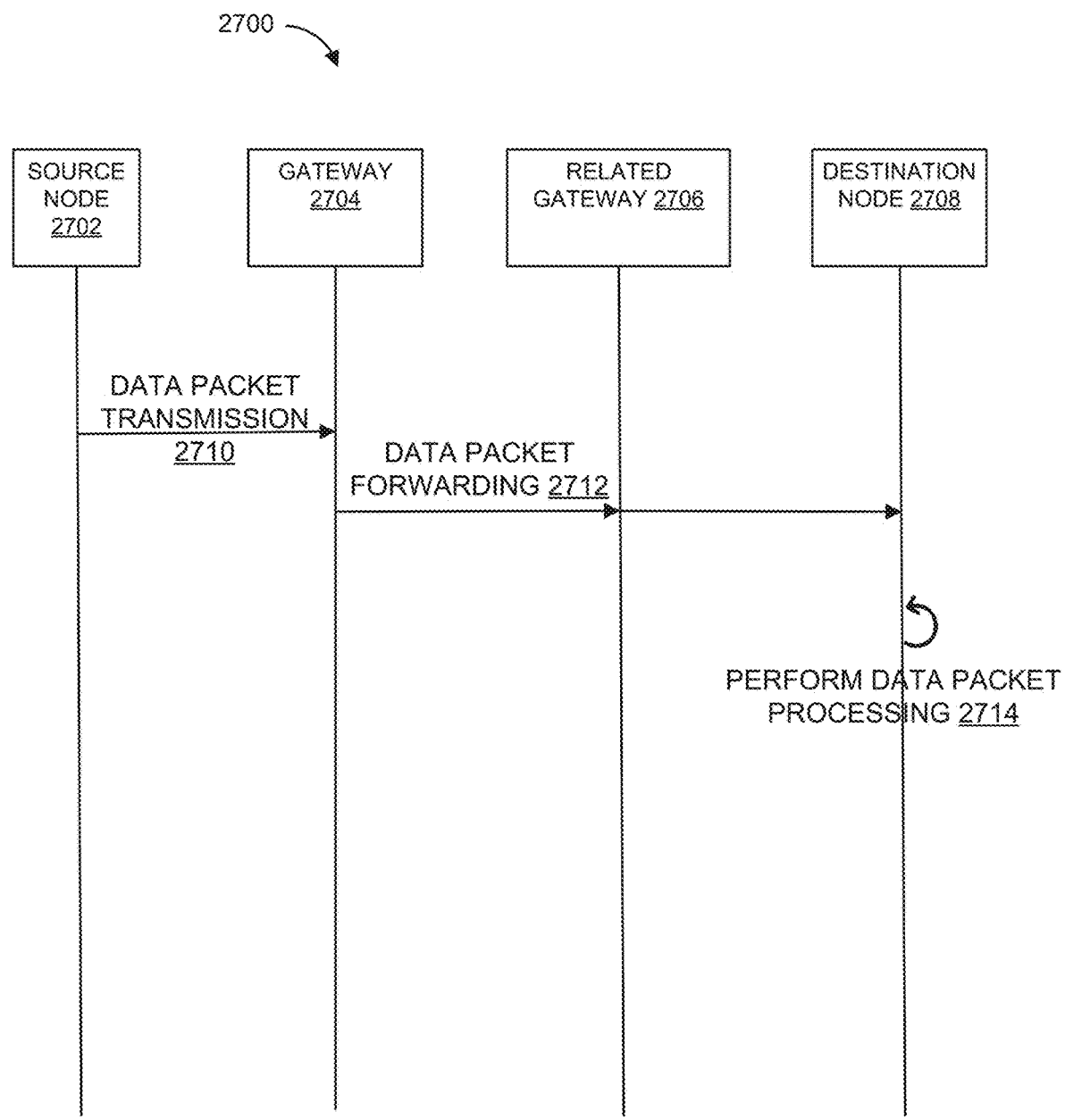
FIG. 27 is a signaling process for a data packet processing, in accordance with various embodiments.

FIG. 27 is a signaling process 2700 for a data packet processing, in accordance with various embodiments. Based on the operations described above, it may be possible to securely transmit and receive packets between an authorized source node and an authorized destination node while maintaining confidentiality and integrity of the tunnel using the application flow ID.

A source node 2702 may transmit data packets 2710 to a gateway 2704. The source node may insert the application flow ID into the data packet to be transmitted by the application based on the application flow routing table received from the controller. It then may encrypt the packet (excluding the application flow ID) and transmit the packet to the gateway using the generated node flow. This may be valid when the source node has created a control flow with the controller. When the source node is not able to set up a control flow with the controller, plain text data packet may be transmitted to the gateway.

The gateway 2704 may forward the data packet 2712 to a related gateway 2706, and the related gateway 2706 may forward the packet to the destination node 2708. The gateway may receive the data packets through the node flow connected to the source node. The gateway may inspect the application flow ID to query the application flow routing table from that identifies the receiving port (or NIC) and the sending port (or NIC). The gateway may use the information to decode the packet and process instructions to manipulate the packet. The packet is then forwarded using the gateway flow or the node flow to the target gateway.

However, if the gateway does not find the application flow ID, the gateway may query the controller for the information. If the application flow ID is valid, the gateway may receive the application flow routing table information. The gateway may then process the packet as defined above. If the ID is not found in the controller then the packet may be dropped.

If the source node cannot set up a control flow with the controller, the gateway may request the controller to create application flow ID based on the source node IP, destination node IP, and the service port. Once the gateway receives the application flow routing table information, it may process the packet according to the instructions in the table.

The destination node 2708 may receive a data packet and perform data packet processing 2714. The destination node may remove the application flow ID from the packet. The destination node may use this information to look up the application flow routing table and process the packet according to the instructions, e.g. decode the encrypted packet. The destination node may then propagate the packet to the application layer.

If the destination node cannot create a control flow with the controller, then it may receive a plain text data packet that will not include the application flow ID. In such a scenario, the gateway connected to the destination node may have performed the appropriate packet processing.

A source node may create a control flow. The source node may insert the application flow ID into a data packet to be transmitted to a destination node. The source node may encrypt the packet if instructed by the controller and can report status information of the device and an application to the controller.

In some embodiments, a source node may be unable to create a control flow. A first gateway connected to a source node may add the application flow ID to a data packet according to an application flow routing table. The first gateway may encrypt the packet as defined in the application flow routing table.

In some embodiments, a destination node can create a control flow. The destination node may receive an encrypted packet from a gateway. The destination node may remove the application flow ID from the packet. The destination node may decrypt the packet as defined in the application flow routing table. The destination node may pass the packet to an appropriate application.

In some embodiments, a destination node may be unable to create a control flow. A gateway may remove the application flow ID from a packet. Based on the instructions in the application flow routing table, the gateway may decrypt the packet. The gateway may forward a plain text packet to the destination node.

Node Flow Termination

Figure 28:
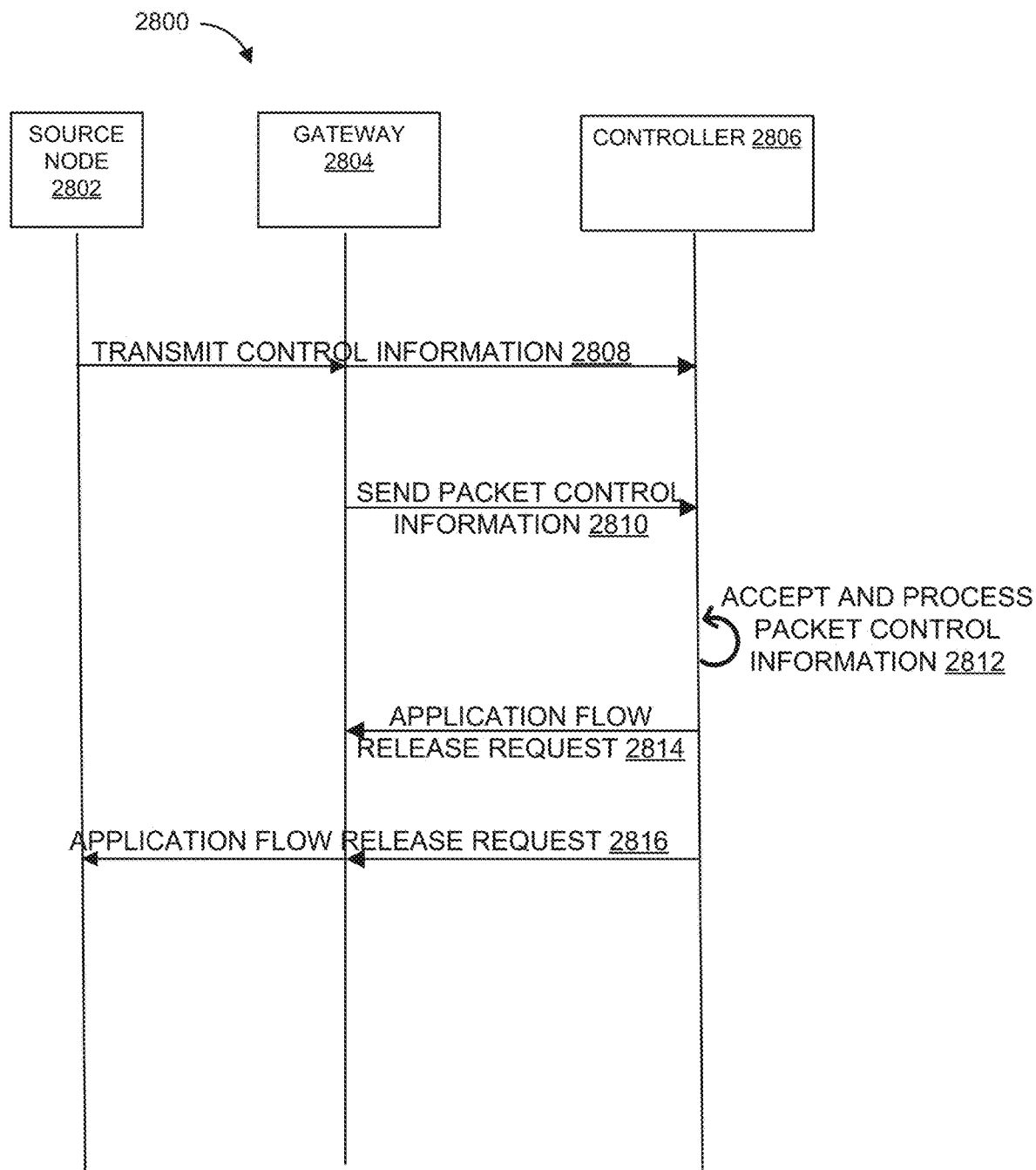
FIG. 28 is a signaling process for a node flow termination process, in accordance with various embodiments.

FIG. 28 is a signaling process 2800 of a node flow termination process, in accordance with various embodiments. In this process, if there is a threat to the node flow and application flow, the node flow and application flow between the source node and the destination node can be released to maintain a secure network state.

The source node and the destination node can generate control flow to the controller periodically send control information to the controller. The control information may include the inspection results generated by the node as requested and defined by the controller and can be used to manage and control the terminal and the application. Using this information, it can be detected whether the terminal or the application transmitting the data is tampered or not, and whether there are there any threats to the node flow and the application flow.

A source node 2802 may transmit control information 2808 to a gateway 2804, and the gateway 2804 can forward the control information to a controller 2806.

If the gateway 2804 determines that the data packet containing the received the application flow ID is different from the basic information in the application flow routing table, then it may be considered a threat and the packet control information 2810 (application flow ID) is sent to the controller 2806.

A controller 2806 may accept and process packet control information 2812 received from the gateway 2804. The controller may check the received control information and determines that the application flow has been compromised. If it is, the controller may delete the application flow routing table and all related information stored in the controller.

The controller 2806 may request the release of the application flow from the source node 2802 by sending an application flow release request 2814 to a gateway 2804. The controller 2806 may send an application flow release request 2816 to the gateway 2804, which may be forwarded to the source node 2802. The application flow termination process may isolate nodes of the network in such a way that threats or malicious code may not be received on the data packets.

Figure 29:
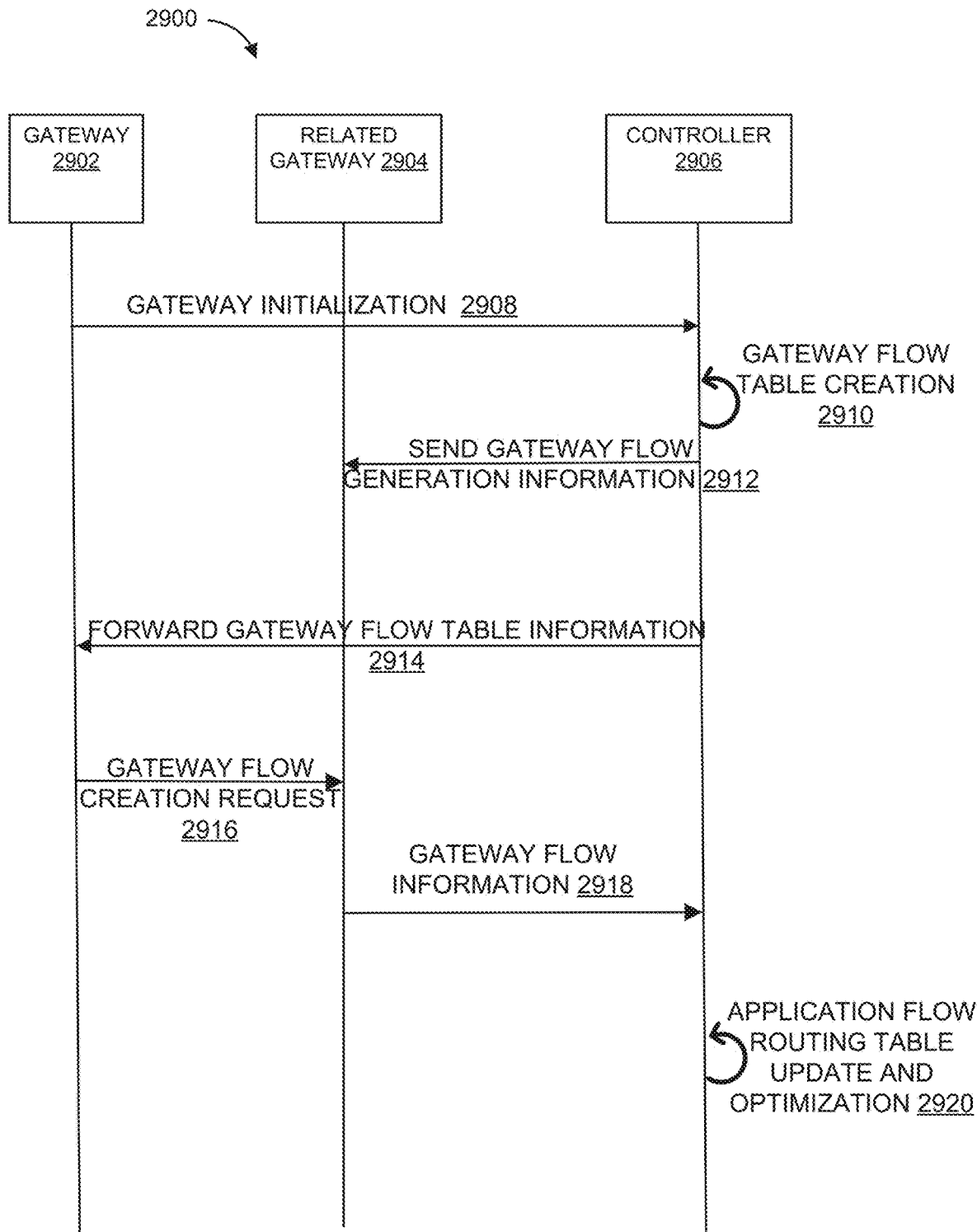
FIG. 29 is a signaling process illustrating a gateway flow creation process, in accordance with various embodiments.

FIG. 29 is a signaling process 2900 illustrating a gateway flow creation process, in accordance with various embodiments. With the gateway flow creation process, each time a gateway is added, a source node can form an optimal node flow with adjacent gateways and provide a routing table for efficient transmission of data packets.

The gateway 2902 may transmit an indication 2908 that the gateway is ready to perform a role as a gateway at initialization based on information registered in a controller 2906.

The controller 2906 may analyze the path between the neighboring gateways located on the application flow routing table and create a gateway flow table 2910.

The controller 2906 may send gateway flow generation information 2912 to a related gateway 2904. The controller may send to each neighboring gateway its IP address and initialization information (or a Key) to create a gateway flow. Each receiving gateway may wait to receive gateway flow generation request.

The controller 2906 may pass gateway flow table information 2914 to gateway 2902. The gateway flow table information may include a neighboring gateway IP address and an initialization information list, so that the gateway can generate gateway flows with neighboring gateways.

Gateway 2902 may send a gateway flow creation request 2916 to a related gateway 2904.

When a related gateway 2904 completes the generation of the gateway flows with gateway 2902, related gateway may send the gateway flow ID information 2918 to the controller 2906.

When a gateway flow set is completed, an application flow routing table may be updated and optimized 2920 by the controller 2920.

Using this approach, a terminal may be able to use an optimal gateway, where load balancing and QoS can be performed on the node flow. Using the application flow information may be an efficient path that can be used to reach the destination node.

Gateway Flow Termination

Figure 30:
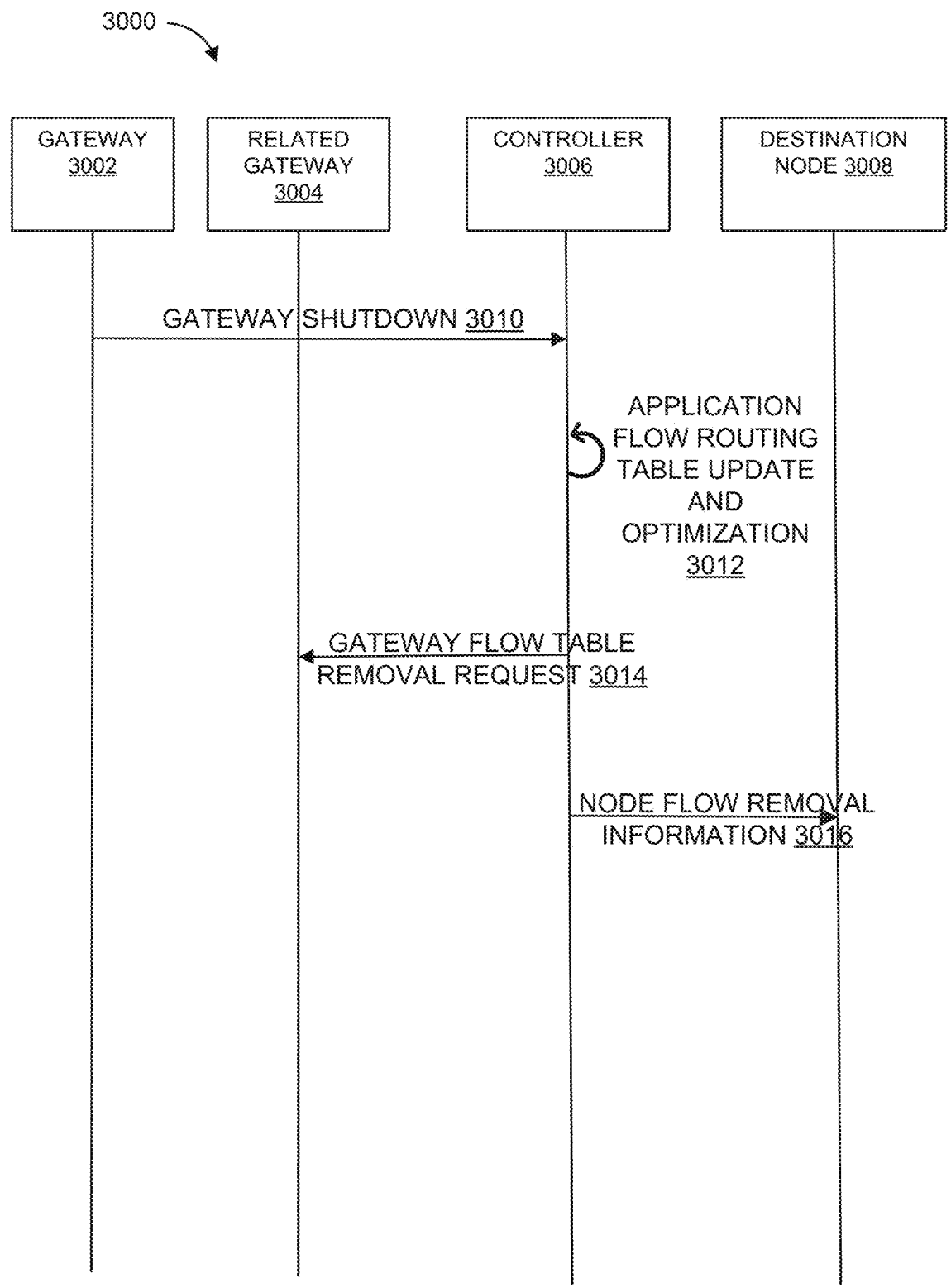
FIG. 30 is a signaling process for terminating a getaway flow, in accordance with various embodiments.

FIG. 30 is a signaling process 3000 for terminating a gateway flow, in accordance with various embodiments. Using this process, it is possible to reconstruct an existing node flow every time a gateway is removed and can provide a routing table that may efficiently transmit data packets.

Based on the information registered in the controller in advance, a gateway 3002 may notify the controller 3006 using a gateway shutdown message 3010 indicating that the gateway is shutting down and should be removed from all network nodes. In some embodiments, if heartbeat information transmitted by the gateway to the controller exceeds a predetermined time, an indication may be sent indicating that the gateway has failed.

The controller 3006 may update and optimize the application flow routing table 3012. Upon removal of the corresponding gateway, the application flow routing table in the controller may be updated to remove the gateway flow and optimize the routing information.

Using this approach, the terminal may be able to use optimal gateway, and load balancing and QoS can be performed on the node flow and using the application flow information an efficient path can be used to reach the destination node.

The controller 3006 may remove the gateway from the gateway flow table.

The controller 3006 may send a gateway flow removal request 3014 to a related gateway 3004. The gateway flow removal request may inform the related gateway to remove the deleted gateway from the gateway flow table.

The controller may confirm the node flow table removal of the gateway. From the node flow table, the deleted gateway may be removed, and the table may be updated with the new gateway.

The controller 3006 may send node flow removal information 3016 to the destination node 3008. The Node Flow removal information 3016 may provide new node flow information. The controller may request the node to remove the node flow connected to the deleted gateway.

Figure 31:
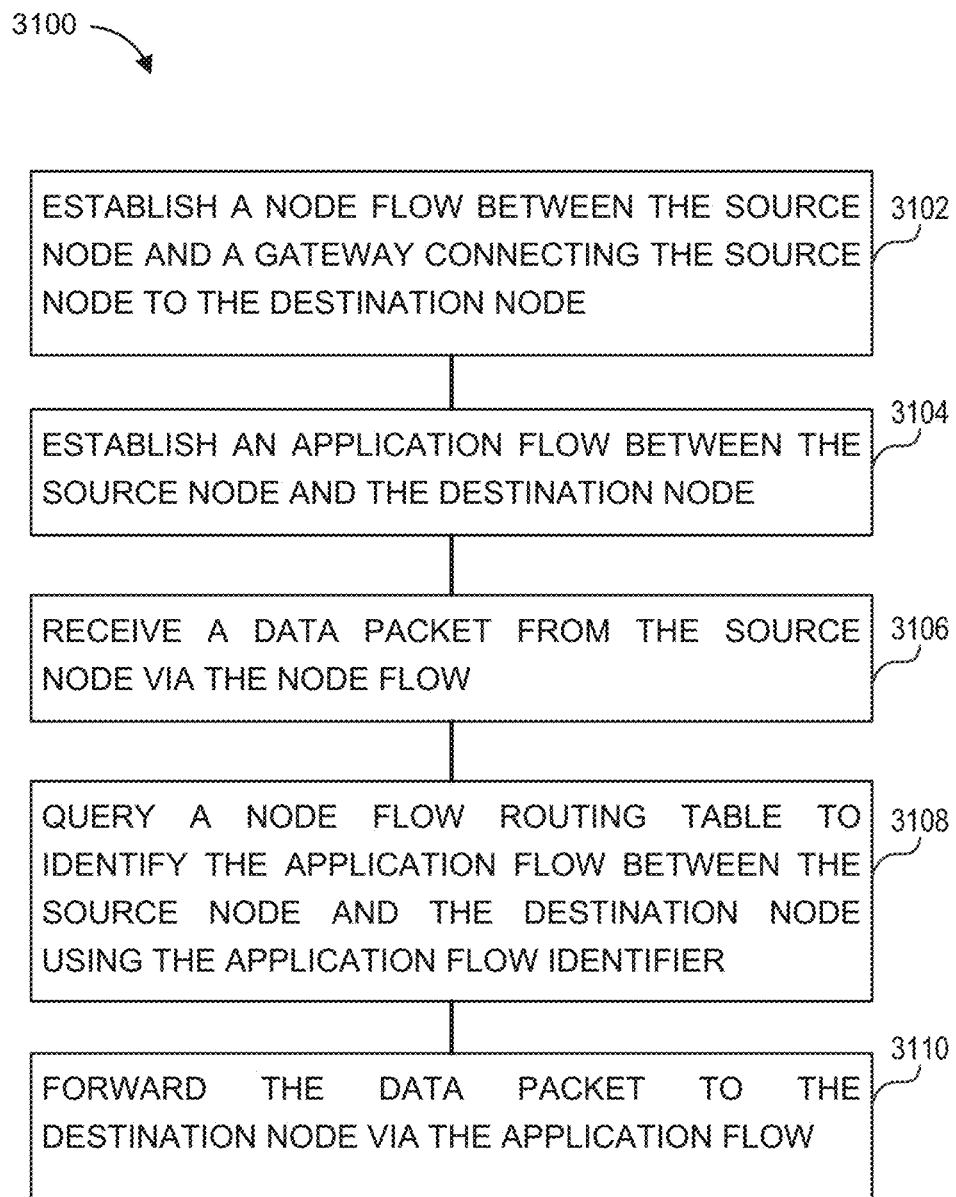
FIG. 31 illustrates a block diagram of a method to securely transfer data between a source node and a destination node in a network, in accordance with various embodiments.

FIG. 31 illustrates a block diagram 3100 of a method to securely transfer data between a source node and a destination node in a network, in accordance with various embodiments.

The method may include establishing a node flow between the source node and a gateway connecting the source node to the destination node (block 3102). The node flow may include a tunnel facilitating data transmission between the source node and the gateway. The node flow may be identified in a node flow routing table providing packet processing information for forwarding data packets through the network.

In some embodiments, establishing the node flow between the source node and the gateway includes establishing a control flow between the gateway and a controller, where the control flow includes a tunnel configured to forward management information between the gateway and the controller. Establishing the node flow may also include receiving, by the gateway, a node flow request from the source node, the node flow request including a destination node identifier. Establishing the node flow may also include forwarding, by the gateway, the node flow request to the controller. Establishing the node flow may also include receiving, by the gateway, node flow initialization information from the controller, the node flow initialization information providing instructions to create a node flow tunnel between the gateway and the source node. Establishing the node flow may also include receiving, by the gateway, a node flow establishment message from the source node. Establishing the node flow may also include responsive to receiving the node flow establishment message, creating, by the gateway, the node flow tunnel between the gateway and the source node based on the node flow initialization information, the node flow tunnel facilitating transmission of data packets between the source node and gateway.

In some embodiments, the controller is configured to generate a list of potential gateways and send the list of potential gateways to the source node. When the node flow request does not include a valid destination node identifier, the source node may be configured to establish the node flow between the source node and one gateway included in the list of potential gateways.

The method may include establishing an application flow between the source node and the destination node (block 3104). The application flow may facilitate data packet transmission between the source node and destination node via the node flow.

In some embodiments, establishing the application flow between the source node and the destination node includes receiving, by the gateway, an application flow request from the source node, where the application flow request includes a node flow identifier, a destination node identifier, and a source node application identifier. Establishing the application flow may include forwarding, by the gateway, the application flow request to a controller, the controller configured to verify the destination node identifier and the source node application identifier and generate the node flow routing table. Establishing the application flow may include receiving, by the gateway, the node flow routing table from the controller. Establishing the application flow may include forwarding application flow information to both the source node and the destination node.

In some embodiments, establishing the Application flow between the source node and the destination node includes receiving, by the gateway, a data packet from the source node, the data packet including a header (e.g., UDP header, internet protocol (IP) header, a transmission control protocol (TCP) header). Establishing the application flow may also include identifying, by the gateway, the destination node by inspecting the received data packet. Establishing the application flow may also include forwarding, by the gateway, the data packet to a controller, the controller configured to verify the destination node identifier and the source node application identifier and generate the node flow routing table. Establishing the application flow may also include receiving, by the gateway, the node flow routing table from the controller. Establishing the application flow may also include forwarding application flow information to the source node and the destination node.

The method may include receiving a data packet from the source node via the node flow, the data packet including an application flow identifier (block 3106).

The method may include querying a node flow routing table to identify the application flow between the source node and the destination node using the application flow identifier (block 3108).

In some embodiments, the method may include responsive to the gateway being unable to identify the destination node from the application flow identifier, querying, by the gateway, a controller for the application flow identifier associated with the source node, and receiving, by the gateway, the node flow routing table information indicating that the application flow identifier is valid.

The method may include responsive to identifying the application flow between the source node and the destination node, forwarding the data packet to the destination node via the application flow (block 3110).

In some embodiments, the method may include extracting, by the destination node, the application flow identifier from the data packet, processing, by the destination node, the data packet according to the application flow identifier, and forwarding, by the destination node, the data packet to an application of the destination node.

In some embodiments, the method may include receiving, by the gateway, periodic source node control information and application control information relating to the source node. The method may also include determining, by the gateway, that an application flow identifier provided in the source node control information does not match any application flow identifier included in the application flow routing table. The method may also include responsive to determining that the second application flow identifier does not match any application flow identifier included in the application flow routing table, forwarding, by the gateway, the source node control information to a controller, where the controller is configured to determine whether the source node is compromised and to delete the application flow routing table stored in the controller upon determining the source node is compromised. The method may also include receiving, by the gateway, an application flow release request from the controller, the gateway and the source node are configured to release any application flow information associated with the source node upon receipt of application flow release request.

In some embodiments, the method may include transmitting, by the gateway, gateway initialization information to a controller indicating that the gateway is initialized, wherein the controller is configured to analyze a path between neighboring gateways using the node flow routing table and create a gateway flow table; The method may also include receiving, by the gateway, gateway flow generation information from the controller, the gateway flow generation information including an identifier for the gateway and initialization information to facilitate creation of a gateway flow between the gateway and a neighboring gateway. The method may also include transmitting, by the gateway, a gateway flow creation request to the neighboring gateway to establish the gateway flow between the gateway and the neighboring gateway, wherein neighboring gateway is configured to forward a gateway flow identifier identifying the gateway flow to the controller, the controller configured to update the node flow routing table with the gateway flow identifier.

In some embodiments, the method may include receiving, by a controller, a gateway termination message from the gateway requesting to remove the gateway from any node flows. The method may also include updating, by the controller, the application flow routing table based on receiving the gateway termination message. The method may also include sending, by the controller, a remove gateway flow request to any of a neighboring gateway, a source node, and a destination node, the remove gateway flow request indicating a request to remove information associating the gateway to any node flows.

In some embodiments, the method includes establishing a destination node flow between the destination node and a neighboring gateway connected to the gateway and the destination node. The method may also include forwarding, by the gateway, the data packet to the neighboring gateway, wherein the neighboring gateway is configured to forward the data packet to the destination node via the destination node flow.

Processing System

Figure 32:
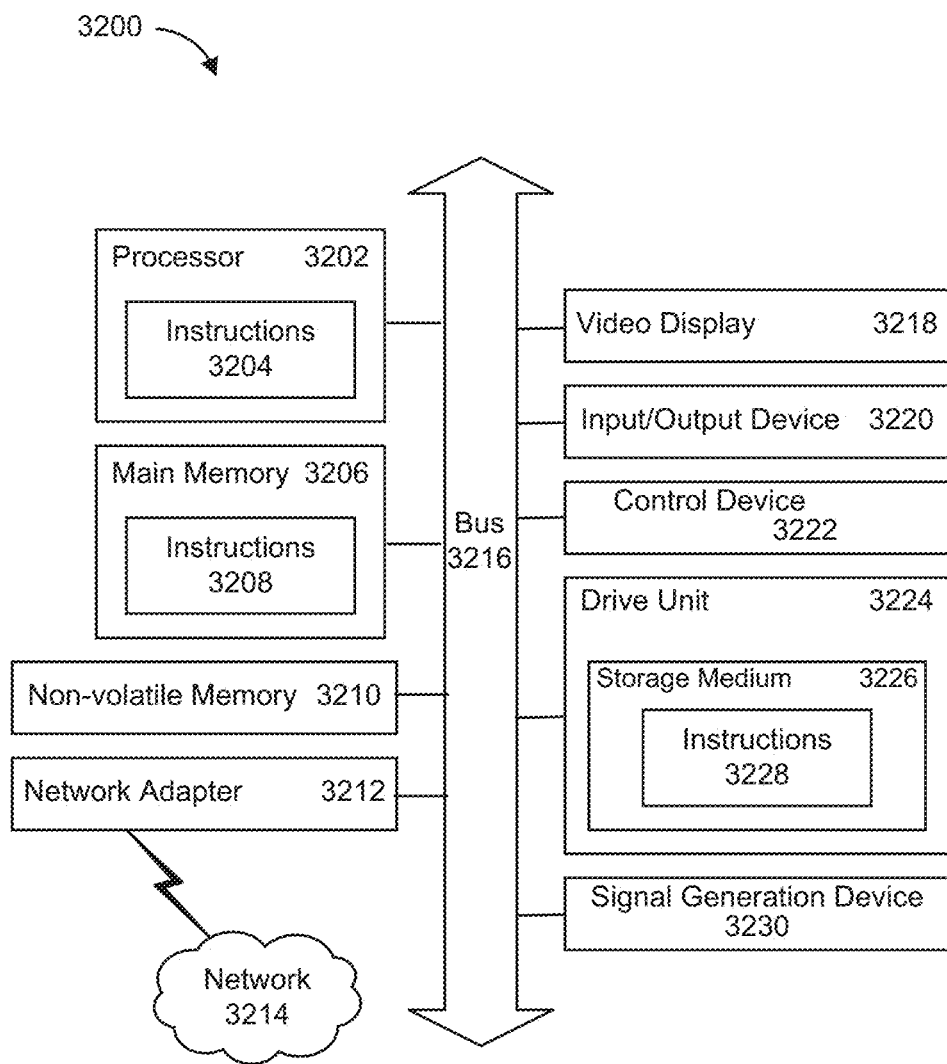
FIG. 32 is a block diagram illustrating an example of a processing system in which at least some operations described herein can be implemented.

FIG. 32 is a block diagram illustrating an example of a processing system in which at least some operations described herein can be implemented. For example, some components of the processing system 3200 can be hosted on an electronic device as described in the present embodiments.

The processing system 3200 can include one or more central processing units ("processors") 3202, main memory 3206, non-volatile memory 3210, network adapter 3212 (e.g., network interface), video display 3218, input/output devices 3220, control device 3222 (e.g., keyboard and pointing devices), drive unit 3224 including a storage medium 3226, and signal generation device 3230 that are communicatively connected to a bus 3216. The bus 3216 is illustrated as an abstraction that represents one or more physical buses and/or point-to-point connections that are connected by appropriate bridges, adapters, or controllers. The bus 3216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1594 bus (i.e., "Firewire").

The processing system 3200 can share a similar computer processor architecture as that of a desktop computer, tablet computer, personal digital assistant (PDA), smartphone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 3200.

While the main memory 3206, non-volatile memory 3210, and storage medium 3226 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 3228. The term "machine-readable medium" and "storage medium" shall also be taken to include any medium that is capable of storing, encoding, or carrying a set of instructions for execution by the processing system 3200.

In general, the routines executed to implement the embodiments of the disclosure can be implemented as part of an operating system or a specific application, component, program, object, module, or sequence of instructions (collectively referred to as "computer programs"). The computer programs typically comprise one or more instructions (e.g., instructions 3204, 3208, 3228) set at various times in various memory and storage devices in a computing device. When read and executed by the one or more processors 3202, the instruction(s) cause the processing system 3200 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 3210, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 3212 enables the processing system 3200 to mediate data in a network 3214 with an entity that is external to the processing system 3200 through any communication protocol supported by the processing system 3200 and the external entity. The network adapter 3212 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 3212 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The techniques disclosed herein can include a tool or system to extract information from a design drawing to supplement the capabilities of a product manufacturing process. The present embodiments can assist in the generation/modification of a quote/estimate, the generation of manufacture feedback, the manufacturing scheduling/ordering process, etc.

REMARKS

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

What is claimed is:

1. A method to securely transfer data between a source node and a destination node in a network, the method comprising:
    establishing a node flow between the source node and a gateway connecting the source node to the destination node, the node flow identified in a node flow routing table providing packet processing information for forwarding data packets through the network;
    establishing an application flow between the source node and the destination node, the application flow facilitating application-specific data packet transmission between the source node and destination node via the node flow;
    receiving, by the gateway from the source node via the node flow, a data packet that includes an application flow identifier;
    querying, by the gateway, an application flow routing table to identify routing instructions for the application flow between the source node and the destination node using the application flow identifier; and
    responsive to identifying the application flow between the source node and the destination node, forwarding, by the gateway, the data packet to the destination node via the application flow according to the routing instructions for the application flow.

2. The method of claim 1, wherein the establishing the node flow between the source node and the gateway includes:
    establishing a control flow between the gateway and a controller, the control flow including a tunnel configured to forward management information between the gateway and the controller;
    receiving, by the gateway, a node flow request from the source node, the node flow request including a destination node identifier;
    forwarding, by the gateway, the node flow request to the controller;
    receiving, by the gateway, node flow initialization information from the controller, the node flow initialization information providing instructions to create a node flow tunnel between the gateway and the source node;
    receiving, by the gateway, a node flow establishment message from the source node; and
    responsive to receiving the node flow establishment message, creating, by the gateway, the node flow tunnel between the gateway and the source node based on the node flow initialization information, the node flow tunnel facilitating transmission of data packets between the source node and the gateway.

3. The method of claim 2, wherein the controller is configured to generate a list of potential gateways and send the list of potential gateways to the source node in response to the node flow request not including a valid destination node identifier, wherein the source node is configured to establish the node flow between the source node and one gateway included in the list of potential gateways.

4. The method of claim 1, wherein the establishing the application flow between the source node and the destination node includes:
    receiving, by the gateway, an application flow request from the source node, the application flow request including a node flow identifier, a destination node identifier, and a source node application identifier;
    forwarding, by the gateway, the application flow request to a controller, the controller configured to verify the destination node identifier and the source node application identifier and generate the application flow routing table;
    receiving, by the gateway, the application flow routing table from the controller; and
    forwarding application flow information to both the source node and the destination node.

5. The method of claim 1, wherein said establishing the application flow between the source node and the destination node includes:
    receiving, by the gateway, a data packet from the source node, the data packet including a header;
    identifying, by the gateway, the destination node by inspecting the received data packet;
    forwarding, by the gateway, the data packet to a controller, the controller configured to verify a destination node identifier and a source node application identifier and generate the application flow routing table;
    receiving, by the gateway, the application flow routing table from the controller; and
    forwarding application flow information to the source node and the destination node.

6. The method of claim 1, further comprising:
    responsive to the gateway being unable to identify the destination node from the application flow identifier, querying, by the gateway, a controller for the application flow identifier associated with the source node;
    receiving, by the gateway, application flow routing table information indicating that the application flow identifier is valid.

7. The method of claim 1, further comprising:
    extracting, by the destination node, the application flow identifier from the data packet;
    processing, by the destination node, the data packet according to the application flow identifier; and
    forwarding, by the destination node, the data packet to an application of the destination node.

8. The method of claim 1, further comprising:
    receiving, by the gateway, source node control information and application control information relating to the source node;
    determining, by the gateway, that the application flow identifier provided in the source node control information does not match any application flow identifier included in the application flow routing table;
    responsive to determining that a second application flow identifier does not match any application flow identifier included in the application flow routing table, forwarding, by the gateway, the source node control information to a controller, where the controller is configured to determine whether the source node is compromised and to delete the application flow routing table stored in the controller upon determining the source node is compromised; and
    receiving, by the gateway, an application flow release request from the controller, the gateway and the source node are configured to release any application flow information associated with the source node upon receipt of the application flow release request.

9. The method of claim 1, further comprising:
    transmitting, by the gateway, gateway initialization information to a controller indicating that the gateway is initialized, wherein the controller is configured to analyze a path between neighboring gateways using the application flow routing table and create a gateway flow table;

receiving, by the gateway, gateway flow generation information from the controller, the gateway flow generation information including an identifier for the gateway and initialization information to facilitate creation of a gateway flow between the gateway and a neighboring gateway; and transmitting, by the gateway, a gateway flow creation request to the neighboring gateway to establish the gateway flow between the gateway and the neighboring gateway, wherein the neighboring gateway is configured to forward a gateway flow identifier identifying the gateway flow to the controller, the controller configured to update the application flow routing table with the gateway flow identifier.

10. The method of claim 1, further comprising:
receiving, by a controller, a gateway termination message from the gateway requesting to remove the gateway from any node flows;
updating, by the controller, the application flow routing table based on receiving the gateway termination message; and
sending, by the controller, a remove gateway flow request to any of a neighboring gateway, the source node, and the destination node, the remove gateway flow request indicating a request to remove information associating the gateway to any node flows.

11. The method of claim 1, further comprising:
establishing a destination node flow between the destination node and a neighboring gateway connected to the gateway and the destination node; and
forwarding, by the gateway, the data packet to the neighboring gateway, wherein the neighboring gateway is configured to forward the data packet to the destination node via the destination node flow.

12. A method comprising:
receiving, by a gateway, a data packet from a source node via a node flow, the data packet including an application flow identifier identifying an application flow that facilitates application-specific secure data transmission between the source node and a destination node;
querying, by the gateway, an application flow routing table that provides packet processing information for forwarding data packets through a network with the application flow identifier to identify the application flow between the source node and the destination node; and
responsive to identifying the application flow between the source node and the destination node, forwarding, by the gateway, the data packet to the destination node according to the packet processing information for the application flow.

13. The method of claim 12, further comprising:
establishing a control flow between the gateway and a controller, the control flow including a tunnel configured to forward management information between the gateway and the controller;
receiving, by the gateway, a node flow request from the source node, the node flow request including a destination node identifier;
forwarding, by the gateway, the node flow request to the controller;
receiving, by the gateway, node flow initialization information from the controller, the node flow initialization information providing instructions to create a node flow tunnel between the gateway and the source node;
receiving, by the gateway, a node flow establishment message from the source node; and responsive to receiving the node flow establishment message, creating, by the gateway, the node flow tunnel between the gateway and the source node based on the node flow initialization information, the node flow tunnel facilitating transmission of data packets between the source node and gateway.

14. The method of claim 11, further comprising:
receiving, by the gateway, an application flow request from the source node, the application flow request including a node flow identifier, a destination node identifier, and a source node application identifier;
forwarding, by the gateway, the application flow request to a controller, the controller configured to verify the destination node identifier and the source node application identifier and generate the application flow routing table;
receiving, by the gateway, the application flow routing table from the controller; and
forwarding application flow information to both the source node and the destination node.

15. The method of claim 11, further comprising:
receiving, by the gateway, source node control information and application control information relating to the source node;
determining, by the gateway, that the application flow identifier provided in the source node control information does not match any application flow identifier included in the application flow routing table;
responsive to determining that a second application flow identifier does not match any application flow identifier included in the application flow routing table, forwarding, by the gateway, the source node control information to a controller, where the controller is configured to determine whether the source node is compromised and to delete the application flow routing table stored in the controller upon determining the source node is compromised; and
receiving, by the gateway, an application flow release request from the controller, the gateway and the source node are configured to release any application flow information associated with the source node upon receipt of the application flow release request.

16. The method of claim 11, further comprising:
transmitting, by the gateway, gateway initialization information to a controller indicating that the gateway is initialized, wherein the controller is configured to analyze a path between neighboring gateways using the application flow routing table and create a gateway flow table;
receiving, by the gateway, gateway flow generation information from the controller, the gateway flow generation information including an identifier for the gateway and initialization information to facilitate creation of a gateway flow between the gateway and the neighboring gateway; and
transmitting, by the gateway, a gateway flow creation request to the neighboring gateway to establish the gateway flow between the gateway and the neighboring gateway, wherein the neighboring gateway is configured to forward a gateway flow identifier identifying the gateway flow to the controller, the controller configured to update the application flow routing table with the gateway flow identifier.

17. The method of claim 11, further comprising:
receiving, by a controller, a gateway termination message from the gateway requesting to remove the gateway from any node flows;

updating, by the controller, the application flow routing table based on receiving the gateway termination message; and sending, by the controller, a remove gateway flow request to any of the neighboring gateway, the source node, and the destination node, the remove gateway flow request indicating a request to remove information associating the gateway to any node flows.

18. The method of claim 11, wherein the source node is configured to encrypt the data packet and the destination node is configured to decrypt the data packet based on information included in the application flow routing table.

19. A system to facilitate secure transfer of data between a source node and a destination node, the system comprising:

a gateway connecting the source node to the destination node, the gateway having software stored on memory that when executed is configured to:

receive an application flow routing table from a controller;

establish a node flow with the source node upon receipt of a node flow creation message from the source node that includes node flow initialization information;

receive a data packet from the source node via the node flow, the data packet including an application flow identifier;

query the application flow routing table to identify routing information for an application flow between the source node and the destination node based on the routing information for the application flow; and responsive to identifying the application flow between the source node and the destination node, forward the data packet to the destination node via the application flow.

20. The system of claim 19, the controller further configured to: establish a control flow with the gateway, the control flow including a tunnel configured to forward management information between the gateway and the controller.

21. The system of claim 19, the controller further configured to: receive a node flow request message from the source node indicating a request to establish the node flow, the node flow request message including a destination node identifier; determine whether the destination node identifier is a valid destination node identifier; responsive to determining that the destination node identifier is not valid, generate a list of potential gateways; and send the list of potential gateways to the source node, the source node configured to establish the node flow between the source node and one gateway included in the list of potential gateways.

22. The system of claim 19, the gateway further configured to:

identify the destination node by inspecting the received data packet, the data packet including a header;

forward the data packet to the controller, the controller configured to verify a destination node identifier and a source node application identifier and update the application flow routing table;

receive the updated application flow routing table from the controller; and forward application flow information to both the source node and the destination node.

23. The system of claim 19, further comprising:

responsive to the gateway being unable to identify the destination node from the application flow identifier, query the controller for the application flow identifier associated with the source node; and receive application flow routing table information indicating that the application flow identifier is valid.

24. The system of claim 19, the destination node configured to:

decrypt the data packet based on information included in the application flow routing table;

extract the application flow identifier from the data packet;

process the data packet according to the application flow identifier; and forward the data packet to an application of the destination node.

25. The system of claim 19, the gateway further configured to:

receive periodic source node control information and application control information relating to the source node;

determine that the application flow identifier provided in the source node control information does not match any application flow identifier included in the application flow routing table;

responsive to determining that a second application flow identifier does not match any application flow identifier included in the application flow routing table, forward the source node control information to the controller, the controller configured to determine whether the source node is compromised and to delete the application flow routing table stored in the controller upon determining the source node is compromised;

receive an application flow release request from the controller; and release any application flow information associated with the source node upon receipt of the application flow release request.

26. The system of claim 19, the gateway further configured to:

transmit gateway initialization information to the controller indicating that the gateway is initialized, the controller configured to analyze a path between neighboring gateways using the application flow routing table and create a gateway flow table;

receive gateway flow generation information from the controller, the gateway flow generation information including an identifier for the gateway and initialization information to facilitate creation of a gateway flow between the gateway and a neighboring gateway; and transmit a gateway flow creation request to the neighboring gateway to establish the gateway flow between the gateway and the neighboring gateway, the neighboring gateway configured to forward a gateway flow identifier identifying the gateway flow to the controller, the controller configured to update the application flow routing table with the gateway flow identifier.

27. The system of claim 19, the gateway further configured to:

receive a gateway termination message from the gateway requesting to remove the gateway from any node flows;

update the application flow routing table based on receiving the gateway termination message; and send a remove gateway flow request to any of a neighboring gateway, the source node, and the destination node, the remove gateway flow request indicating a request to remove information associating the gateway to any node flows.

28. The system of claim 19, further including a neighboring gateway connected to the gateway and the destination node, the neighboring gateway configured to:

establish a destination node flow between the destination node and the neighboring gateway;

receive the data packet from the gateway via the node flow; and forward the data packet to the destination node via the destination node.

29. The system of claim 19, the controller configured to:

transmit node flow initialization information to the source node, the node flow initialization information providing instructions to create the node flow;

receive an application flow request to establish the application flow between the source node and the destination node; and generate the application flow routing table that identifies the application flow between the source node and destination node.

* * * * *